(12) United States Patent
Ogawa

(10) Patent No.: US 10,121,365 B2
(45) Date of Patent: Nov. 6, 2018

(54) SENSOR SYSTEM AND COMMUNICATION METHOD

(71) Applicant: KABUSHIKI KAISHA YASKAWA DENKI, Kitakyushu-shi (JP)

(72) Inventor: Kunihiko Ogawa, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 15/461,487

(22) Filed: Mar. 17, 2017

(65) Prior Publication Data

US 2017/0193817 A1 Jul. 6, 2017

Related U.S. Application Data

(63) Continuation of application No. PCT/JP2014/074686, filed on Sep. 18, 2014.

(51) Int. Cl.
*H04Q 9/00* (2006.01)
*G08C 19/20* (2006.01)
*G01D 5/00* (2006.01)
*G01D 5/244* (2006.01)

(52) U.S. Cl.
CPC ............ *G08C 19/20* (2013.01); *G01D 5/00* (2013.01); *G01D 5/244* (2013.01); *H04Q 9/00* (2013.01); *H04Q 2209/00* (2013.01); *H04Q 2209/10* (2013.01); *H04Q 2209/30* (2013.01); *H05K 999/99* (2013.01)

(58) Field of Classification Search
CPC ...... G01D 5/00; G01D 5/244; G06F 13/4247; G06F 13/4256; G08C 19/20; H04L 41/08; H04L 41/0803; H04L 41/0813; H04L 41/0816; H04Q 9/00; H04Q 2209/00; H04Q 2209/10; H04Q 2209/30; H04Q 2209/753; H04Q 2209/756; H04W 88/04
See application file for complete search history.

(56) References Cited

U.S. PATENT DOCUMENTS 6,252,518 B1 * 6/2001 Laborde ............... E21B 47/12
340/855.3
6,625,154 B1 * 9/2003 Murata ............... H04L 12/185
370/395.4

(Continued)

FOREIGN PATENT DOCUMENTS

JP 2003-189654 7/2003
JP 2004-317261 11/2004

(Continued)

OTHER PUBLICATIONS

International Preliminary Report on Patentability (Chapter I) with translation of Written Opinion of the International Searching Authority for corresponding International Application No. PCT/JP2014/074686, Mar. 30, 2017.

(Continued)

*Primary Examiner* — Hai Phan
*Assistant Examiner* — Franklin Balseca
(74) *Attorney, Agent, or Firm* — Mori & Ward, LLP

(57) ABSTRACT

A sensor system includes a controller and sensors. The controller is to transmit a signal. The sensors are connected to the controller in series via at least one cable to sequentially transfer the signal transmitted from the controller via the at least one cable.

16 Claims, 13 Drawing Sheets

(56) References Cited

U.S. PATENT DOCUMENTS

| | | | |
|---|---|---|---|
| 7,002,481 B1* | 2/2006 | Crane | G08B 25/08 |
| | | | 324/207.2 |
| 7,274,968 B1* | 9/2007 | Toyonaga | G05B 19/414 |
| | | | 318/569 |
| 2003/0128007 A1 | 7/2003 | Fujisaki et al. | |
| 2005/0107077 A1* | 5/2005 | Hintermeier | H04W 8/245 |
| | | | 455/419 |
| 2012/0205527 A1 | 8/2012 | Yoshida et al. | |
| 2012/0317253 A1* | 12/2012 | Maekawa | H04L 41/0816 |
| | | | 709/221 |
| 2013/0306849 A1 | 11/2013 | Yoshida et al. | |
| 2013/0345837 A1* | 12/2013 | Sasaki | G05B 19/18 |
| | | | 700/90 |

FOREIGN PATENT DOCUMENTS

| | | |
|---|---|---|
| JP | 2006-050774 | 2/2006 |
| JP | 2007-071612 | 3/2007 |
| JP | 4816988 B2 | 11/2011 |
| JP | 2013-084111 | 5/2013 |
| JP | 2014-006817 | 1/2014 |

OTHER PUBLICATIONS

International Search Report for corresponding International Application No. PCT/JP2014/074686, dated Dec. 16, 2014.
Japanese Office Action for corresponding JP Application No. 2016-548490, dated Nov. 30, 2017 (w/ English machine translation).

* cited by examiner

SENSOR SYSTEM AND COMMUNICATION METHOD

CROSS-REFERENCE TO RELATED APPLICATIONS

The present disclosure contains subject matter related to that disclosed in International Priority Patent Application PCT/JP2014/074686 filed in the Japan Patent Office on Sep. 18, 2014, the entire contents of which are hereby incorporated by reference.

BACKGROUND

Field of the Invention

The present invention relates to a sensor system and a communication method.

Description of the Related Art

Japanese Patent No. 4,816,988 discloses a servo system including: a servo motor; and a control device which acquires position data from an encoder and controls the rotation of the servo motor based on the position data.

SUMMARY

According to one aspect of the disclosure, a sensor system includes a controller and sensors. The controller is to transmit a signal. The sensors are connected to the controller in series via at least one cable to sequentially transfer the signal transmitted from the controller.

According to another aspect of the disclosure, a sensor system includes control means and sensor means. The control means is for transmitting a signal. The sensor means is for sequentially transferring the signal transmitted from the controller via at least one cable.

According to further aspect of the disclosure, a communication method for sensors includes transmitting a signal from a controller to the sensors. The signal is transferred serially via at least one cable among the sensors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
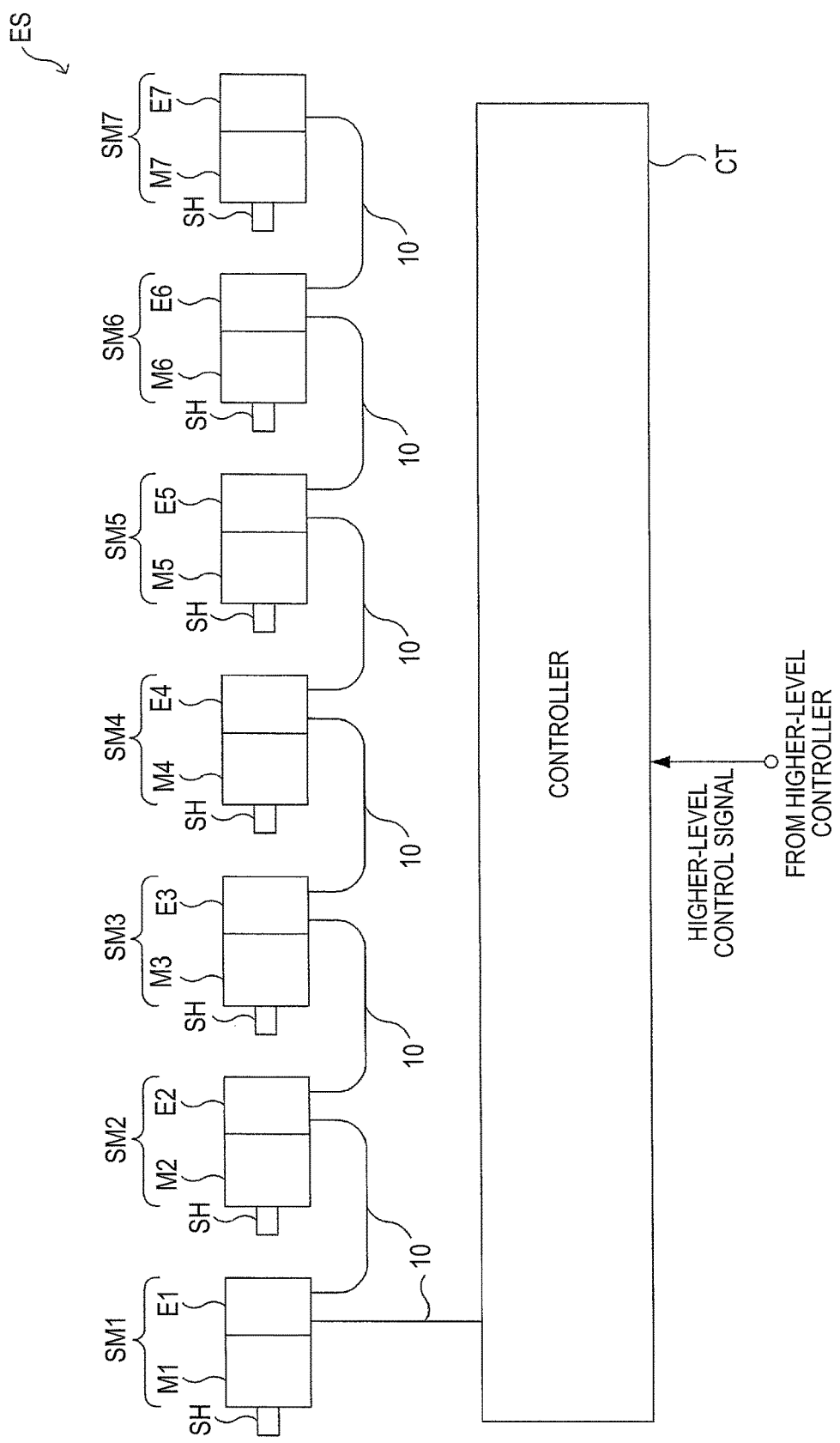
FIG. 1 is an explanatory view for explaining an outline of the configuration of an encoder system according to an embodiment.

The embodiment(s) will now be described with reference to the accompanying drawings, wherein like reference numerals designate corresponding or identical elements throughout the various drawings.

Hereinafter, an embodiment will be described with reference to the drawings. In the description and the drawings, components having substantially the same function are indicated by the same reference sign in principle, and a duplication of the explanation of these components will be omitted accordingly.

Here, a sensor system according to an embodiment described below is a system including a controller and sensors connected to the controller in series via cables such that the sensors sequentially transfer a signal transmitted from the controller. This sensor system is applicable to sensor systems of various types. However, in the description below, an encoder system in which the sensors include at least one encoder used for a motor is described as an example in order to facilitate the understanding of the at least one sensor system. If this sensor system is applied to sensor systems of other types, proper changes can be made such as replacing the encoder with another sensor. Therefore, such cases will not be described further in detail.

The encoder system can be applied to encoder systems of various types such as rotary type or linear type. However, in the description below, a rotary-type encoder will be employed as an example in order to facilitate the understanding of the encoder system. If this encoder system is applied to encoder systems of other types, proper changes can be added such as replacing a rotary motor with a linear motor or changing the object to be measured from a disk to a linear scale. Therefore, such cases will not be described further in detail.

1. Outline of Configuration of Encoder System

First, an outline of the configuration of an encoder system according to this embodiment will be described with reference to FIG. 1.

As shown in FIG. 1, an encoder system ES (corresponding to an example of a sensor system) includes seven servo motors SM1, SM2, SM3, SM4, SM5, SM6, SM7, and a controller CT. However, the number of the servo motors in the encoder system ES is not limited to seven and may be any other number. For the sake of convenience of the description, the description will be made in a case where the number of the servomotors SM in the encoder system ES is seven. In the description below, when the servo motors SM1 to SM7 are not discriminated from each other, these servo motors are simply referred to as the "servo motors SM".

Each of the servomotors SM1 to SM7 has a motor and an encoder. That is, the servo motor SM1 has a motor M1 and an encoder E1. The servo motor SM2 has a motor M2 and an encoder E2. The servo motor SM3 has a motor M3 and an encoder E3. The servo motor SM4 has a motor M4 and an encoder E4. The servo motor SM5 has a motor M5 and an encoder E5. The servomotor SM6 has a motor M6 and an encoder E6. The servo motor SM7 has a motor M7 and an encoder E7. In the description below, when the motors M1 to M7 are not discriminated from each other, these motors are simply referred to as the "motors M", and when the encoders E1 to E7 are not discriminated from each other, these encoders are simply referred to as the "encoders E".

Each of the motors M1 to M7 is an example of a power generation source not including the encoder E. These motors M1 to M7 output a rotational force by rotating a shaft SH about its axial center (not illustrated). In this specification, the rotational force output side of the motors M1 to M7 is referred to as a "load side", and the opposite side is referred to as a "counter-load side". The motors M1 to M7 are not particularly limited and may be any motors whose position, speed and the like can be detected by the encoders E1 to E7.

In some cases, each of the motors M1 to M7 may be called a servo motor on its own. However, in this embodiment, the configuration including the encoder E is called the servo motors SM1 to SM7. That is, each of the servo motors SM1 to SM7 is corresponding to an example of a motor with an encoder. For the sake of convenience of the description, the description will be made with regard to a case where each motor with an encoder is a servo motor controlled to follow target values of position, speed and the like. However, each motor with an encoder is not limited to a servo motor. Each motor with an encoder may be a motor other than a servo motor provided that the motor is provided with the encoder E, for example, in a case where an output from the encoder E is used only for display.

Each of the motors M1 to M7 is not limited to an electric motor which uses electricity as its power source, and may be a motor which uses other power sources, such as a hydraulic motor, pneumatic motor, or steam motor. In the following, a case where each of the motors M1 to M7 is an electric motor is described for the sake of convenience of the description.

The encoders E1 to E7 are connected to the counter-load side of the shaft SH of the respective motors M1 to M7. However, the connecting position of the encoders E1 to E7 is not limited to the counter-load side of the shaft SH of the respective motors M1 to M7 and may be the load side of the shaft SH. These encoders E1 to E7 detect the position of the shaft SH of the respective motors M1 to M7, thus detect the position (also referred to as "rotational position", "angle of rotation" or the like) of the respective motors M1 to M7, and output position data indicating this position.

The encoders E1 to E7 are not particularly limited and may be any types of encoders that can detect the positions or other physical quantity of the respective motors M1 to M7. As the encoders E1 to E7, for example, magnetic encoders, optical encoders, encoders using both magnetic and optical systems (i.e. hybrid encoders) can be used.

Also, the encoders E1 to E7 may detect at least one of the speed (also referred to as "rotational speed", "angular velocity" or the like) and the acceleration (also referred to as "rotational acceleration", "angular acceleration" or the like) of the respective motors M1 to M7, in addition to, or instead of, the position of the respective motors M1 to M7. In this case, the speed and the acceleration can be detected by processing such as applying first-order differentiation or second-order differentiation to the positions with time, or counting a detection signal for a predetermined period of time. In the following, a case where physical quantity detected by the encoders E1 to E7 is a position is described for the sake of convenience of the description.

Also, in this embodiment, sensors including at least the encoder E are connected to the controller CT in series via cables 10. The term "in series" in this specification refers to an arrangement that connects the sensors in a row, that is, daisy-chaining the sensors.

Here, the sensors connected to the controller CT may include sensors other than the encoder E, if the sensors include the encoder E. The sensors other than the encoder E may be a torque sensor, pressure sensor, temperature sensor or the like. In the following, a case where the sensors connected to the controller CT includes only the encoders E is described for the sake of convenience of the description. The number of the encoders E connected to the controller CT may be any number equal to or greater than two. In the following, a case where the number of the encoders E connected to the controller CT is seven is described for the sake of convenience of the description.

That is, the encoders E1 to E7 are connected to the controller CT in series via the cables 10. In this case, the encoder E1 is directly connected to the controller CT via the cable 10. The encoder E2 is connected to the encoder E1 via the cable 10 and thus indirectly connected to the controller CT via the encoder E1. The encoder E3 is connected to the encoder E2 via the cable 10 and thus indirectly connected to the controller CT via the encoders E1 and E2. The encoder E4 is connected to the encoder E3 via the cable 10 and thus indirectly connected to the controller CT via the encoders E1 to E3. The encoder E5 is connected to the encoder E4 via the cable 10 and thus indirectly connected to the controller CT via the encoders E1 to E4. The encoder E6 is connected to the encoder E5 via the cable 10 and thus indirectly connected to the controller CT via the encoders E1 to E5. The encoder E7 is connected to the encoder E6 via the cable 10 and thus indirectly connected to the controller CT via the encoders E1 to E6. That is, the encoder E1 (a proximal sensor) is corresponding to an example of the sensor connected most closely to the controller CT, while the encoder E7 (a distal sensor) is corresponding to an example of the sensor connected most distantly to the controller CT.

As described above, the encoders E1 to E7 connected to the controller CT in series sequentially transfer a signal transmitted from the controller CT, from the nearest sensor to the controller CT (as will be described below).

The controller CT acquires position data from the respective encoders E1 to E7 and controls the operations of the respective motors M1 to M7 based on the position data. Therefore, in this embodiment, where electric motors are used as the motors M1 to M7, the controller CT controls the operations of the motors M1 to M7 by controlling the current or voltage or the like applied to the motors M1 to M7 individually, based on the position data acquired from the respective encoders E1 to E7. Moreover, the controller CT can also acquire a superordinate control signal from a superordinate controller (not illustrated) to control the operations of the respective motors M1 to M7 such that the shaft SH outputs a rotational force enough to set the position indicated by the superordinate control signal. If the motors M1 to M7 use other power sources such as hydraulic, pneumatic, or steam power sources, the controller CT can control these power supply sources to control the motions of the respective motors M1 to M7.

Here, the configuration of the encoder system ES is not particularly limited provided that the encoder system ES includes the controller CT and the encoders E1 to E7 connected to the controller CT in series such that the encoders E1 to E7 sequentially transfer a signal transmitted from the controller CT. In the following, a case where the encoder system ES is configured to be able to change settings about functions of the encoders E is described for the sake of convenience of the description.

2. Configurations of Controller and Encoder

Next, the configurations of the controller CT and the encoders E1 to E7 will be described with reference to FIGS. 2 and 3.

Figure 2:
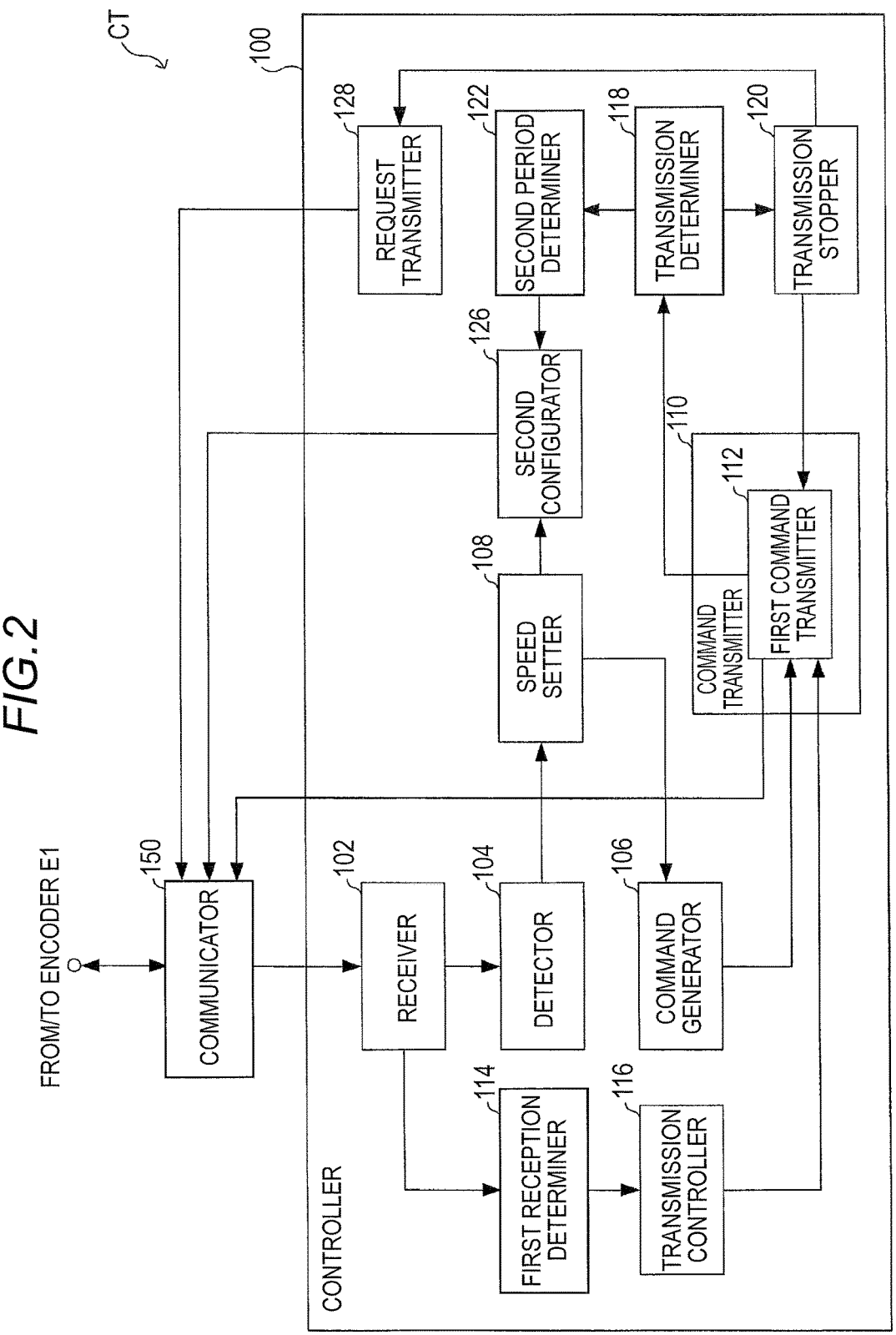
FIG. 2 is an explanatory view for explaining the configuration of a controller according to the embodiment.
Figure 3:
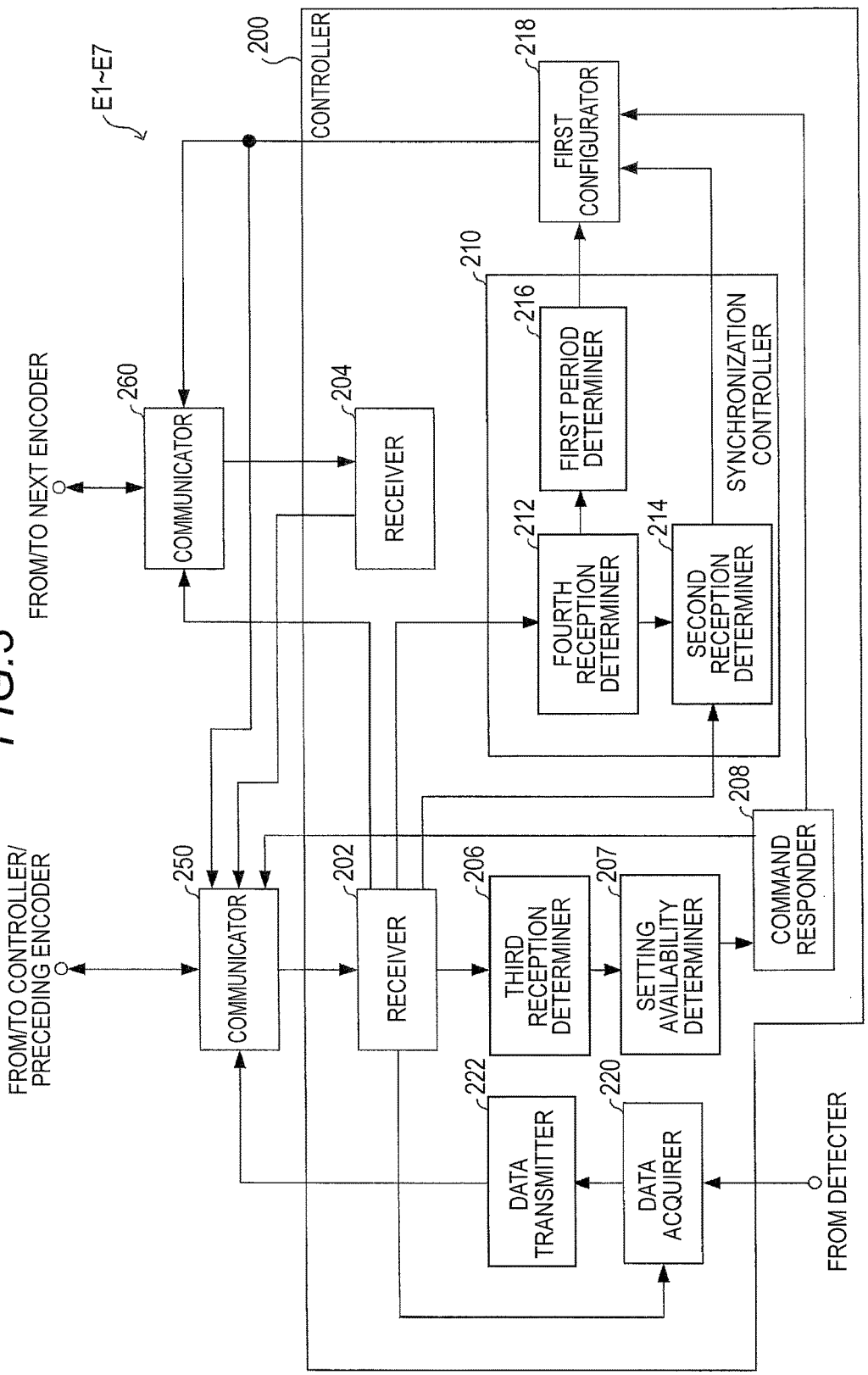
FIG. 3 is an explanatory view for explaining the configuration of an encoder according to the embodiment.

As shown in FIGS. 2 and 3, the controller CT includes a communicator 150 and a processing device 100. Meanwhile, each of the encoders E1 to E7 includes two communicators 250, 260, and a processing device 200.

The communicator 150 of the controller CT communicates with the encoder E1 based on a predetermined communication protocol. The communicator 150 of the controller CT can be implemented by a communication device 923 (see FIG. 11 below) provided in the controller CT.

The communicator 250 of each of the encoders E1 to E7 communicates via a predetermined communication protocol with the controller CT or a relaying encoder Er provided between the controller CT and the each of the encoders E1 to E7. The communicator 250 of each of the encoders E1 to E7 can be implemented by a communication device 823 (see FIG. 12 below) provided in each of the encoders E1 to E7.

The communicator 260 of each of the encoders E1 to E7 communicates with a further encoder Ef based on a predetermined communication protocol. The communicator 260 of each of the encoders E1 to E7 can be implemented by a communication device 825 (see FIG. 12 below) provided in each of the encoders E1 to E7. In this embodiment, as the encoder E7 is the encoder E connected most distantly from the controller CT and there is no encoder E following the encoder E7, the encoder E7 may not include the communicator 260.

The processing device 100 of the controller CT transmits a request signal which causes the acquisition of sensing data at a predetermined timing (corresponding to an example of a second timing) of a sensing target, to the encoder E1 via the communicator 150. The request signal is not particularly limited if a request signal is for the acquisition of sensing data at a predetermined timing of the sensing target. For example, a position request command or the like may be employed. The position request command is a request signal which causes the acquisition of position data (corresponding to an example of sensing data) at a predetermined timing (also referred to as a "position latch timing") of the corresponding motor M (corresponding to an example of a sensing target). For the sake of convenience of the description, the description will be made with regard to a case where the request signal transmitted from the processing device 100 is a position request command.

The position request command transmitted from the controller CT to the encoder E1 is sequentially transferred up to the encoder E7 by the encoders E1 to E7. The position request command transmitted from the controller CT to the encoder E1 may also be sequentially transferred to a target encoder Et that is the target of the position request command, by one or more encoders E from the encoder E1 to the target encoder Et. In the following, a case where the position request command transmitted from the controller CT to the encoder E1 is sequentially transferred up to the encoder E7 by the encoders E1 to E7 is described for the sake of convenience of the description.

The processing device 100 of the controller CT is configured to perform control to transmit a command signal to the encoder E1 via the communicator 150. The command signal changes the functional settings of the encoder E from the current setting to a target setting. The functional setting of the encoder E may be the mode of communication with the controller CT (for example, the communication speed, transmission channel code and the like with the controller CT), the position latch timing or the like.

The command signal transmitted from the controller CT to the encoder E1 is sequentially transferred up to the encoder E7 by the encoders E1 to E7. The command signal transmitted from the controller CT to the encoder E1 may also be sequentially transferred up to the target encoder Et that is the target of the command signal, by one or more encoders E from the encoder E1 to the target encoder Et. In the following, a case where the command signal transmitted from the controller CT to the encoder E1 is sequentially transferred up to the encoder E7 by the encoders E1 to E7 is described for the sake of convenience of the description.

When the processing device 200 of each of the encoders E1 to E7 receives the position request command, the processing device 200 acquires position data at the position latch timing of the corresponding motor M and transmits the position data to the controller CT directly or via one or more relaying encoders Er located between the encoder E and the controller CT. Meanwhile, when the processing device 200 of each of the encoders E1 to E7 receives the command signal, the processing device 200 changes the functional setting thereof to a predetermined setting (a target setting).

In other words, the processing device 100 of the controller CT and the processing device 200 of each of the encoders E1 to E7 are corresponding to an example of means for changing the functional setting of sensors from the current setting to a predetermined setting (the target setting).

In this case, the processing device 100 of the controller CT may generate a command signal designating one encoder E among the encoders E1 to E7 to change the functional setting of the encoder E.

When the processing device 200 of an encoder E, which is provided in each of the encoders E1 to E7, receives the command signal designating the encoder E itself and when it determines that the functional setting of the encoder E is changeable to a predetermined setting, the controller 200 may transmit a response signal to the controller CT directly, or via one or more relaying encoders Er located between the encoder E and the controller CT.

The processing device 100 of the controller CT may sequentially transmit command signals which designate the respective encoders E1 to E7, in a sequential order from the command signal designating the encoder E1 (the proximal sensor E1) to the command signal designating the encoder E7 (the distal sensor E7). In this case, when the processing device 100 of the controller CT receives a response signal from a previously designated encoder Ep to which the command signal was transmitted, the processing device 100 may transmit a command signal designating the encoder E next to the previously designated encoder Ep in the above sequential order.

The processing device 200 of each of the encoders E1 to E7 (synchronized processing sensors E1 to E7) may synchronize timing of changing the functional setting of the encoder E, which is corresponding to an example of a first timing (hereinafter also referred to as a "timing of change"), with timings of changing of other encoders E, based on the result of reception of a signal from the controller CT. This coordinates the timings of changing the functional settings of the encoders E1 to E7 to be substantially the same. In this case, the processing device 200 of each of the encoders E1 to E7 may change the setting after the lapse of a predetermined period, which is corresponding to an example of a first period (hereinafter also referred to as a "first period"), by following the reception of the command signal designating the encoder E7. More specifically, the processing device 200 of each of the encoders E1 to E7 may change the settings respectively in a case of any signal being not received from the controller CT during the first period.

When the processing device 100 of the controller CT receives the response signal from the encoder E7, the processing device 100 may change the functional setting of the controller CT from the current setting to a predetermined setting corresponding to the target setting of the encoder E. The functional setting of the controller CT may be communication modes with the encoder E, such as the communication speed, transmission channel code, and other factors with the encoder E. In this case, the processing device 100 of the controller CT may stop the transmission of a signal to the encoder E after transmitting a command signal designating the encoder E7, and may change the setting after the lapse of a predetermined period (corresponding to an example of a second period; hereinafter also referred to as a "second period") that is longer than the first period after transmitting the command signal designating the encoder E7.

The processing device 100 of the controller CT may transmit to the encoder E1 a communication mode change command (corresponding to an example of a first command signal) to change the communication mode with the controller CT (corresponding to an example of the functional setting of the encoder) from the current communication mode (corresponding to an example of the current setting) to a predetermined communication mode (a target communication mode) (corresponding to an example of a predetermined setting), as a command signal. In this case, the processing device 100 of the controller CT may transmit, to the encoder E1 at a first speed, a speed change command (corresponding to an example of a second command signal) as an example of the communication mode change command, the speed change command being to change the communication speed with the controller CT (corresponding to an example of the communication mode with the controller) to a second speed (corresponding to an example of a predetermined communication mode) that is higher than the current first speed (corresponding to an example of the current communication mode). When the processing device 200 of each of the encoders E1 to E7 receives the speed change command, the processing device 200 may change the communication speed with the controller CT to the second speed. In this case, the processing device 100 of the controller CT may set the second speed based on the number of the encoders E connected to the controller CT.

Hereinafter, an example where an example of the configurations of the processing device 100 of the controller CT and the processing device 200 of each of the encoders E1 to E7 is implemented more specifically with functional blocks will be described.

2-1. Controller of Controller CT

As shown in FIG. 2, the processing device 100 of the controller CT includes a request transmitter 128, a receiver 102, a command transmitter 110, a detector 104, a speed setter 108, a command generator 106, a first reception determiner 114, a transmission controller 116, a transmission determiner 118, a transmission stopper 120, a second period determiner 122, and a second configurator 126. A configurator may be also called as a setting changer. These functionalities of the processing device 100 can be implemented by a program executed by a CPU 901 (see FIG. 11 below) provided in the controller CT or by a control device 907 (see FIG. 12 below) provided in the controller CT.

The request transmitter 128 transmits the position request command to the encoder E1 on a predetermined communication cycle via the communicator 150. The position request command transmitted from the controller CT to the encoder E1 is sequentially transferred up to the encoder E7 by the encoders E1 to E7. The request transmitter 128 may also transmit a position request command which designates one encoder E among the encoders E1 to E7, or may transmit a common position request command to each of the encoders E1 to E7 without designating the one encoder E. In the following, a case where the request transmitter 128 transmits a common position request command to each of the encoders E1 to E7 is described for the sake of convenience of the description.

The receiver 102 receives a signal (position data, response signal or the like) transmitted from the encoder E1 via the communicator 150. Accordingly, the receiver 102 detects reception of the signal from the controller CT by the encoders E1 to E7.

The command transmitter 110 is configured to perform control to transmit the command signal to the encoder E1 via the communicator 150. The command signal is not particularly limited provided that the command signal is for changing the functional setting of the encoder E. For example, the command signal can be the communication mode change command, a command signal which causes the position latch timing to be changed, or the like. In the following, a case where the command signal transmitted from the command transmitter 110 is the communication mode change command is described for the sake of convenience of the description. That is, the command transmitter 110 includes a first command transmitter 112.

The first command transmitter 112 is configured to perform control to transmit the communication mode change command to the encoder E1 via the communicator 150. The communication mode change command is not particularly limited provided that the communication mode change command is for changing the communication mode of the encoder E with the controller CT. For example, the communication mode change can be the speed change command, a transmission channel code change command which causes the transmission channel code to be changed, a communication mode change command which causes both the communication speed and the transmission channel code to be changed, or the like. In the following, a case where the communication mode change command transmitted from the first command transmitter 112 is the speed change command is described for the sake of convenience of the description. That is, the first command transmitter 112 transmits the speed change command, as the communication mode change command, to the encoder E1 via the communicator 150 at the first speed. In short, the first command transmitter 112 is corresponding to an example of a second command transmitter as well.

That is, in this embodiment, the communication speed of the controller CT with the encoder E, that is, the communication speed of the communicator 150, is changeably set to one of predetermined speeds. The values and number of speeds that can be changeably set as the communication speed of the communicator 150 are not particularly limited.

In the following, a case where there are three speeds that can be changeably set as the communication speed of the communicator 150 is described for the sake of convenience of the description. The three speeds are a speed V1 (4 Mbps, for example), a speed V2 higher than the speed V1 (8 Mbps, for example), and a speed V3 higher than the speed V2 (16 Mbps, for example). That is, the communicator 150 of the controller CT has its communication speed settable among the three speeds V1, V2, and V3, and executes communication at the set speed.

Similarly, the communication speed of each of the encoders E1 to E7 with the controller CT, that is, the communication speed of the communicators 250 and 260, can be changeably set to one of predetermined speeds. The values and number of speeds that can be changeably set as the communication speed of the communicators 250 and 260 are not particularly limited. In the following, a case where there are three speeds that can be changeably set as the communication speed of the communicators 250 and 260 is described for the sake of convenience of the description. The three speeds are the speed V1, speed V2, and speed V3, similarly to the communication speed of the communicator 150 of the controller CT. That is, the communicators 250 and 260 of each of the encoders E1 to E7 have their communication speed settable among the three speeds V1, V2, and V3, and execute communication at the set speed.

The communication speeds of the communicator 150 of the controller CT and the communicators 250 and 260 of each of the encoders E1 to E7 may be initially set to any of the speed V1, speed V2, and speed V3. In the following, a case where the communication speeds of the communicator 150 of the controller CT and the communicators 250 and 260 of each of the encoders E1 to E7 are initially set to the lowest speed V1 is described for the sake of convenience of the description.

Figure 4A:
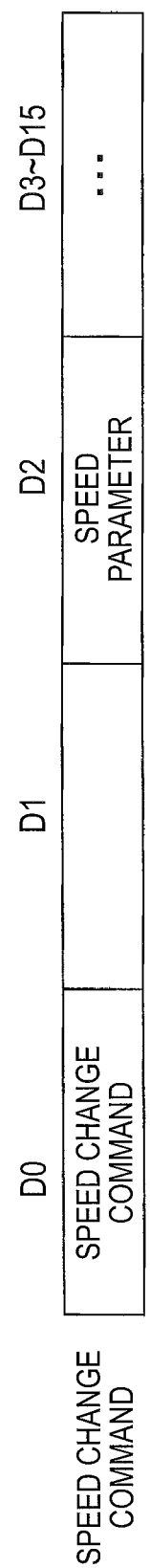
FIG. 4A is an explanatory view for explaining an example of the data structure of a speed change command.

FIG. 4A shows an example of the data structure of the speed change command.

In the example shown in FIG. 4A, the speed change command includes sixteen data D0 to D15. Content of the data D0 indicates the speed change command, and that of the data D1 is blank. Content of the data D2 contains a speed parameter indicating the second speed. Each of the data D3 to D15 has respective content or leaves it as blank, though not described in detail.

The data structure of the speed change command shown in FIG. 4A is only an example. Data structures other than the above may also be employed.

As shown in FIG. 2, the detector 104 detects the number of the encoders E connected to the controller CT based on the result of reception by the receiver 102 (for example, the number of signals received from the encoder E which responds to the signal from the controller CT). In this embodiment, since the encoders E1 to E7 are connected to the controller CT in series, the detector 104 is expected to detect that the number of the encoders E connected to the controller CT is seven. The detector 104 may be omitted if the number of the encoders E connected to the controller CT is predetermined, if the operator inputs the number of the encoders E connected to the controller CT, if the second speed based on the number of the encoders E connected to the controller CT is not set, or the like. In the following, a case where the detector 104 is included in the processing device 100 is described for the sake of convenience of the description.

The speed setter 108 sets the second speed based on the number of the encoders E detected by the detector 104. The speed setter 108 may be omitted if the operator inputs the second speed, if the second speed is constant, or the like. In the following, a case where the speed setter 108 is present is described for the sake of convenience of the description.

The command generator 106 generates the speed change command to be transmitted from the first command transmitter. At this time, the command generator 106 generates the speed change command to change the communication speed of the communicators 250 and 260 to the second speed set by the speed setter 108. The command generator 106 may also generate the speed change command to change the communication speed of the communicators 250 and 260 to a predetermined second speed. In the following, a case where the command generator 106 generates the speed change command to change the communication speed of the communicators 250 and 260 to the second speed set by the speed setter 108 is described for the sake of convenience of the description. The command generator 106 also generates the speed change command designating one encoder E among the encoders E1 to E7. The command generator 106 may also generate a common speed change command to each of the encoders E1 to E7 without designating any one encoder E. In the following, a case where the command generator 106 generates the speed change command designating one encoder E is described for the sake of convenience of the description. In this embodiment, the command generator 106 generates the speed change command designating one encoder E among the encoders E1 to E7 sequentially from the proximal sensor E1 to the distal sensor E7.

The first reception determiner 114 determines whether or not the controller CT receives a response signal from the encoder E to which the speed change command is transmitted by the first command transmitter 112, based on the result of reception by the receiver 102. The first reception determiner 114 may be omitted if the encoder E does not transmit any response signal, or the like. In the following, a case where the first reception determiner 114 is included in the processing device 100 is described for the sake of convenience of the description.

The transmission controller 116 controls the first command transmitter 112 in such a way as to sequentially transmit the speed change commands designating the respective encoders E1 to E7 generated by the command generator 106, in the sequential order of the speed change command designating the encoder E1, the speed change command designating the encoder E2, the speed change command designating the encoder E3, the speed change command designating the encoder E4, the speed change command designating the encoder E5, the speed change command designating the encoder E6, and the speed change command designating the encoder E7. In this case, if the first reception determiner 114 determines that a response signal is received from the previously designated encoder Ep, the transmission controller 116 controls the first command transmitter 112 in such a way as to transmit the speed change command designating another encoder E subsequently following the previously designated encoder Ep in the above order.

If an encoder E does not transmit a response signal, or the like, the transmission controller 116 may control the first command transmitter 112 in such a way as to sequentially transmit the speed change commands designating the respective encoders E1 to E7 on a predetermined cycle in the above order. In the following, a case is described for the sake of convenience of the description in which the transmission controller 116 controls the first command transmitter 112 in such a way as to transmit the speed change command designating another encoder E subsequently following the previously designated encoder Ep in the above order if the first reception determiner 114 determines that a response is received from the previous designated encoder Ep. The transmission controller 116 may be omitted if a common speed change command is transmitted to each of the encoders E1 to E7. In the following, fa case where the transmission controller 116 is included in the processing device 100 is described for the sake of convenience of the description.

In this embodiment, the transmission controller 116 controls the first command transmitter 112 to transmit the speed change command, designating one encoder E, in a repeating manner such as at a predetermined time interval (at an interval of 25 ms or shorter, for example) for a predetermined period (for 75 ms, for example), or at the predetermined time interval for a predetermined number of times (three times, for example). The transmission controller 116 may also control the first command transmitter 112 in such a way as to transmit the speed change command designating one encoder E only once or in a repeating manner until a response signal is received. In the following, a case is described for the sake of convenience of the description in which the transmission controller 116 controls the first command transmitter 112 in such a way as to sequentially transmit the speed change command designating one encoder E at a predetermined time interval or shorter for a predetermined number of times.

The transmission determiner 118 determines whether the speed change command designating the encoder E7 is transmitted by the first command transmitter 112 or not. The transmission determiner 118 may be omitted if it is not necessary to determine the speed change command designating the encoder E7 whether it is transmitted or not. In the following, a case where the transmission determiner 118 is included in the processing device 100 is described for the sake of convenience of the description.

The transmission stopper 120 stops the transmission of signals to the encoder E after the first command transmitter 112 transmits the speed change command designating the encoder E7. That is, the transmission stopper 120 stops the entire transmissions of signals to the encoder E, including the transmission of the speed change command by the first command transmitter 112 and the transmission of the position request command by the request transmitter 128. The transmission stopper 120 may stop the transmission of the speed change command by the first command transmitter 112 only. In the following, a case where the transmission stopper 120 stops the entire transmissions of signals to the encoder E is described for the sake of convenience of the description. In this case, the transmission stopper 120 stops the transmission if the transmission determiner 118 determines that the speed change command designating the encoder E7 is transmitted by the first command transmitter 112. The transmission stopper 120 may be omitted if it is not necessary to stop the transmission of signals to the encoder E after the controller CT transmits the speed change command designating the encoder E7. In the following, a case where the transmission stopper 120 is present is described for the sake of convenience of the description.

The second period determiner 122 determines whether or not the second period (for example, 40 ms) has passed since the first command transmitter 112 transmits the speed change command designating the encoder E7. In this case, the second period determiner 122 carries out this determination if the transmission determiner 118 determines that the first command transmitter 112 transmits the speed change command designating the encoder E7. The second period determiner 122 may be omitted if it is not necessary to determine whether the second period has passed since the speed change command designating the encoder E7 is transmitted. In addition, a case where the second period determiner 122 is included in the processing device 100 is described for the sake of convenience of the description.

The second configurator 126 changes the functional setting related to the controller CT from the current setting to a predetermined setting corresponding to the target setting of the encoder E, if the first reception determiner 114 determines that a response signal is received from the encoder E7. In this embodiment, where the speed change command is transmitted, as to the functional setting of the controller CT, the second configurator 126 changes the communication speed of the communicator 150 from the current speed (corresponding to an example of the current setting), or from the first speed, to a predetermined speed corresponding to a target speed of the encoder E (corresponding to an example of the predetermined setting corresponding to the target speed of the encoder), or to the second speed set by the speed setter 108. In any cases, the second configurator 126 changes the communication speed of the communicator 150 to the second speed if the second period determiner 122 determines that the second period has passed. Timing of changing the communication speed of the communicator 150 by the second configurator 126 need not necessarily be after it is determined that the second period has passed, if the timing is after it is determined that a response signal is received from the encoder E7. In the following, a case is described for the sake of convenience of the description in which the timing of changing the communication speed of the communicator 150 by the second configurator 126 is after it is determined that the second period has passed. The second configurator 126 may be omitted if the functional setting of the controller CT is not to be changed, or the like.

The controller CT may transmit a command (hereinafter referred to as a "confirmation command") to the encoder E1 via the communicator 150 at the second speed the confirmation request command being to request the encoder E1 to confirm that the communication speed of the communicators 250 and 260 of the encoder E is changed to the second speed (requesting the return of a response signal) after the second configurator changes the communication speed of the communicator 150 to the second speed. The confirmation command transmitted to the encoder E1 is sequentially transferred up to the encoder E7 by the encoders E1 to E7. In this case, if a response signal to the confirmation command cannot be received from at least one of the encoders E1 to E7, that is, if the communication speed of the communicators 250 and 260 is not changed to the second speed at least in one encoder E, the controller CT executes predetermined error processing and thus returns the communication speed of the communicators 250 and 260 of the respective encoders E1 to E7, to a previous speed or the speed V1, which is the initial value. For example, as for the processing of transmitting a command, returning the communication speed of the communicators 250 and 260 to the previous speed, to the respective encoders E1 to E7, the processing of restarting the respective encoders E1 to E7 (power-off the switch and power-on the switch), or the like may be performed. Alternatively, the controller CT may simply notify that there is an encoder E in which the communication speed of the communicators 250 and 260 is not changed to the second speed, thereby the operator may restart the respective encoders E1 to E7 (power-off the switch and power-on the switch) to initialize the communication speed of the communicators 250 and 260 of the respective encoders E1 to E7 to the speed V1, for example.

The configuration and arrangement of each component of the processing device 100 of the controller CT shown in FIG. 2 described above is only an example. The processing device 100 of the controller CT may have another configurations and arrangement.

2-2. Controller of Encoder

As shown in FIGS. 3 and 4, the processing device 200 of each of the encoders E1 to E7 includes two receivers 202 and 204, a data acquirer 220, a data transmitter 222, a third reception determiner 206, a setting availability determiner 207, a command responder 208, a s 210, and a first configurator 218. These functionalities of the processing device 200 can be implemented by a program executed by a CPU 801 (see FIG. 12 below) provided in each of the encoders E1 to E7, or by a control device 807 (see FIG. 12 below) provided in each of the encoders E1 to E7.

The receiver 202 receives a signal (speed change command, position request command or the like) transmitted from the controller CT or the relaying encoder Er, via the communicator 250.

The receiver 204 receives a signal (position data, response signal or the like) transmitted from the further encoder Ef, via the communicator 260, and transfers the signal to the controller CT or the relaying encoder Er via the communicator 250. That is, the signal transmitted from each of the encoders E2 to E7 is sequentially transferred up to the controller CT by at least one relaying encoder Er provided between the controller CT and the encoder E itself.

The data acquirer 220 acquires position data at the position latch timing of the corresponding motor M, from a detector (for example, light receiving element, magnetic detection element or the like) provided in the encoder E, not illustrated, in response to the position request command received by the receiver 202.

The data transmitter 222 is configured to perform control to transmit the position data acquired by the data acquirer 220 to the controller CT or the relaying encoder Er via the communicator 250.

The third reception determiner 206 determines whether an encoder E receives a speed change command designating the encoder E itself or not, based on the result of reception by the receiver 202. The third reception determiner 206 may be omitted if a common speed change command is transmitted to each of the encoders E1 to E7 from the controller CT, or the like. In the following, a case where the third reception determiner 206 is included in the processing device 200 is described for the sake of convenience of the description.

The setting availability determiner 207 determines whether the communication speed of the communicators 250 and 260 can be changed to the second speed specified by the speed change command or not, if the third reception determiner 206 determines that the encoder E receives the speed change designating the encoder E itself. The setting availability determiner 207 may be omitted if the communicators 250 and 260 of the encoder E, or the like can communicate at the second speed specified by the speed change command transmitted from the controller CT. In the following, a case where the setting availability determiner 207 is included in the processing device 200 is described for the sake of convenience of the description.

The command responder 208 is configured to perform control to transmit a response signal to the controller CT or the relaying encoder Er via the communicator 250 if the communication speed of the communicators 250 and 260 can be changed to the second speed by the speed change command in the case where the speed change command designating the encoder E itself is received. In this example, the command responder 208 transmits a response signal, if the third reception determiner 206 determines that the encoder E receives the speed change command designating the encoder E and the setting availability determiner 207 determines that the communication speed of the communicators 250 and 260 can be changed to the second speed. The command responder 208 may be omitted if transmitting a response signal to the controller CT is not necessary. In the following description, a case where the command responder 208 is included in the processing device 200 is described for the sake of convenience of the description.

Figure 4B:
FIG. 4B is an explanatory view for explaining an example of the data structure of a response signal.

FIG. 4B shows an example of the data structure of the response signal.

In the example shown in FIG. 4B, the response signal has a data structure in which a status flag is allocated to the data D1 of the speed change command shown in FIG. 4A. The status flag indicates that the communication speed of the communicators 250 and 260 can be set to the second speed indicated by the speed parameter of the data D2.

The data configuration of the response signal shown in FIG. 4B is only an example. Other data configurations may also be employed.

As shown in FIG. 3, the synchronization controller 210 synchronizes the timing of change at which the first configurator 218 changes the communication speed of the communicators 250 and 260, so that this timing of change becomes substantially the same as those of the other encoders E, based on the result of reception by the receiver 202. The synchronization controller 210 may be omitted in a case of the timing of change being not substantially the same among the encoders E1 to E7. In the following, a case where the synchronization controller 210 is included in the processing device 200 is described for the sake of convenience of the description. The configuration of the synchronization controller 210 is not particularly limited and any configuration that enables the synchronization of the timing of change may be employed. For the sake of convenience of the description, a case where the synchronization controller 210 has the following configuration is described. In this configuration, the synchronization controller 210 includes a fourth reception determiner 212, a first period determiner 216, and a second reception determiner 214.

The fourth reception determiner 212 determines whether a speed change command designating the encoder E7 is received or not, based on the result of reception by the receiver 202.

If the fourth reception determiner 212 determines that a speed change command designating the encoder E7 is received by the receiver 202, the first period determiner 216 determines whether or not the first period (for example, 30 ms) has passed since the speed change command is received.

The second reception determiner 214 determines whether or not a signal is received by the receivers 202 and 204 from the controller CT or a relaying encoder Er before the lapse of the first period, based on the result of reception by the receiver 202. The second reception determiner 214 is omitted if the speed is to be changed though a signal is received before the lapse of the first period. In the following, a case where the second reception determiner 214 is included in the processing device 200 is described for the sake of convenience of the description.

The first configurator 218 changes the communication speed of the communicators 250 and 260 to the second speed in the speed change command, if the speed change command is received by the receiver 202. In this case, the first configurator 218 changes the communication speed of the communicators 250 and 260 if the command responder 208 transmits a response signal to the controller CT or the relaying encoder Er. More specifically, the first configurator 218 changes the communication speed of the communicators 250 and 260 if the first period determiner 216 determines that the first period has passed, after the command responder 208 transmits a response signal. Even more specifically, the first configurator 218 changes the communication speed of the communicators 250 and 260, if the first period determiner 216 determines that the first period has passed and the second reception determiner 214 determines that a signal is not received from the controller CT or a relaying encoder E.

However, the condition for the first configurator 218 to change the communication speed of the communicators 250 and 260 is not limited to that it is determined both that the first period is elapsed and that a signal is not received from the controller CT or the relaying encoder E. The condition for this change may be more simplified such that it is determined that the first period is elapsed. Further, the condition may not be limited to that it is determined that the first period is elapsed, but may be that it is determined that a response signal is transmitted to the controller CT or the relaying encoder Er. Still further, the condition is not limited to that it is determined that a response signal is transmitted to the controller CT or the relaying encoder Er, but may be that it is determined that a speed change command is received. In the following, a case is described for the sake of convenience of the description, in which the condition for the first configurator 218 to change the communication speed of the communicators 250 and 260 is a condition satisfying that it is determined both that the first period has passed and that a signal is not received from the controller CT or another encoder E.

The configuration and arrangement of each component of the processing device 200 of the respective encoders E1 to E7 shown in FIG. 3 described above is only an example. The processing device 200 of the respective encoders E1 to E7 may have another configurations and arrangement.

3. Operations of Controller and Encoders

Next, the operations of the controller CT and the encoders E1 to E7 will be described with reference to FIGS. 5 to 9.
3-1. Operations of Controller First, the operations of the controller CT will be described with reference to FIGS. 5 and 6. The processing shown in FIG. 5 and the processing shown in FIG. 6 are carried out in parallel.

Figure 5:
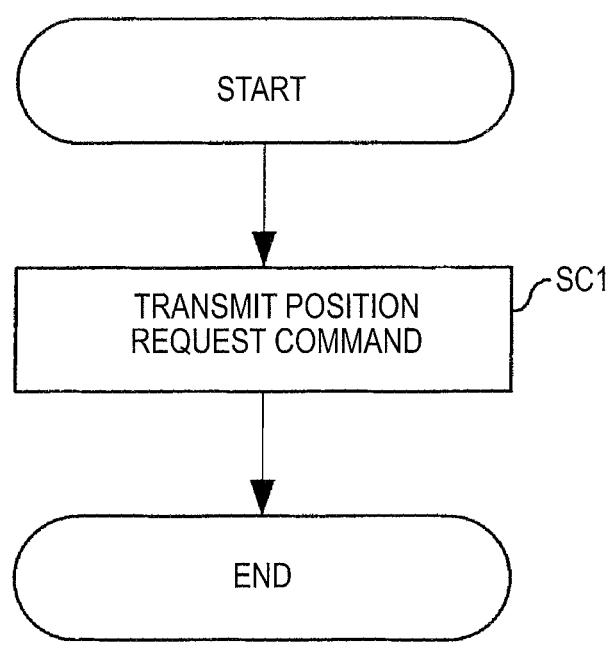
FIG. 5 is an explanatory view for explaining control procedures executed by a processing device of the controller.

As shown in FIG. 5, in Step SC1, the request transmitter 128 transmits a position request command to the encoder E1 via the communicator 150. This Step SC1 is carries out on a predetermined communication cycle.

Figure 6:
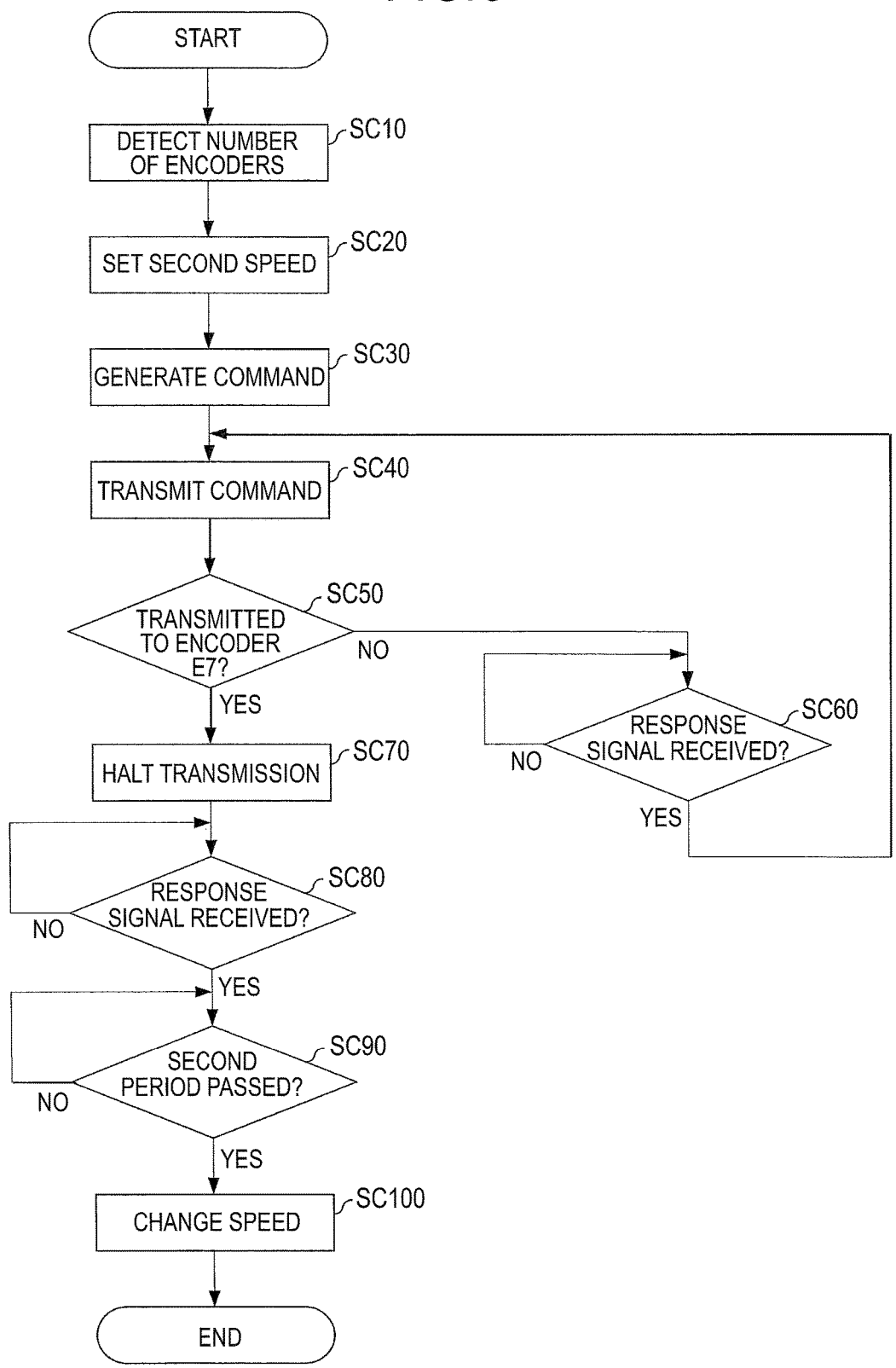
FIG. 6 is an explanatory view for explaining control procedures executed by the processing device of the controller.

Meanwhile, as shown in FIG. 6, in Step SC10, the detector 104 detects the number of the encoders E connected to the controller CT. That is, Step SC10 is corresponding to an example of a detection step. In this embodiment, since the encoders E1 to E7 are connected to the controller CT in series, it is expected to be detected in Step SC10 that the number of the encoders E connected to the controller CT is seven.

After that, in Step SC20, the speed setter 108 sets a second speed based on the number of the encoders E detected in the above Step SC10. That is, Step SC20 is corresponding to an example of a speed setting step.

In Step SC30, the command generator 106 generates a speed change command, changing the communication speed of the communicators 250 and 260 to the second speed set in the above Step SC20, with designating one encoder E from among the encoders E1 to E7. This Step SC30 is executed repeatedly and speed change commands designating the encoders E1 to E7, respectively, are generated. That is, Step SC30 is corresponding to an example of a command generation step.

After that, in Step SC40, under the control of the transmission controller 116, the first command transmitter 112 transmits the speed change commands designating the encoders E1 to E7, respectively, generated in the above Step SC30, to the encoder E1 via the communicator 150 sequentially in the above order and at the first speed. In one cycle of Step SC40, only the speed change command designating one encoder E7 is transmitted, and in the subsequent cycle of Step SC40, the speed change command designating the further encoder Ef in the above order is transmitted. That is, Step SC40 is corresponding to an example of a command transmission step, a first command transmission step, a second command transmission step, and a transmission control step.

Then, in Step SC50, the transmission determiner 118 determines whether or not the speed change command designating the encoder E7 is transmitted in the Step SC40 that is preceded and executed. If a speed change command designating an encoder E other than the encoder E7 is transmitted, the determination in Step SC50 is not satisfied and the processing shifts to Step SC60.

In Step SC60, the first reception determiner 114 determines whether or not a response signal is received from the encoder E to which the speed change command is transmitted in the Step SC40 that is preceded and executed, based on the result of reception by the receiver 102. Until a response signal is received from the encoder E, the determination in Step SC60 is not satisfied and the processing waits in a loop. When a response signal is received from the encoder E, the determination in Step SC60 is satisfied and the above Step SC40 is executed again. Meanwhile, determination of an error is made, for example, if a response signal is not received from the encoder E even after the lapse of a predetermined period, which may be caused by a failure in the communication between the controller CT and the encoder E, or by an inability of the speed change command for changing the communication speed of the encoder E to the second speed.

Meanwhile, if the speed change command designating the encoder E7 is transmitted in Step SC50, the determination in Step SC50 is satisfied and the processing shifts to Step SC70.

In Step SC70, the transmission stopper 120 stops the transmission of the signal to the encoder E. That is, Step SC70 is corresponding to an example of a transmission stop step.

After that, in Step SC80, the first reception determiner 114 determines whether or not a response signal is received from the encoder E7 to which the speed change command is transmitted in the Step SC40, which is preceded and executed, based on the result of reception by the receiver 102. That is, Step SC60 and Step SC80 are corresponding to an example of a first reception determination step. Until a response signal is received from the encoder E7, the determination in Step SC80 is not satisfied and the processing waits in a loop. When a response signal is received from the encoder E7, the determination in Step SC80 is satisfied and the processing shifts to Step SC90. Also, determination of an error is made, for example, if a response signal is not received from the encoder E7 even after the lapse of a predetermined period because of failure in the communication between the controller CT and the encoder E7 or because of the inability to change the communication speed of the encoder E7 to the second speed by the speed change command, or the like.

In Step SC90, the second period determiner 122 determines whether or not a second period has passed since the transmission of the speed change command designating the encoder E7 in the Step SC40 executed immediately before. That is, Step SC90 is corresponding to an example of a second period determination step. Until the second period passes, the determination in Step SC90 is not satisfies and the processing waits in a loop. When the second period has passed, the determination in Step SC90 is satisfied and the processing shifts to Step SC100.

In Step SC100, the second configurator 126 changes the communication speed of the communicator 150 from the first speed to the second speed. That is, Step SC100 is corresponding to an example of a second setting change step.

3-2. Operations of Encoders

Next, the operations of the respective encoders E1 to E7 will be described with reference to FIGS. 7 to 9. The processing shown in FIG. 7, the processing shown in FIG. 8, and the processing shown in FIG. 9 are carried out in parallel.

Figure 7:
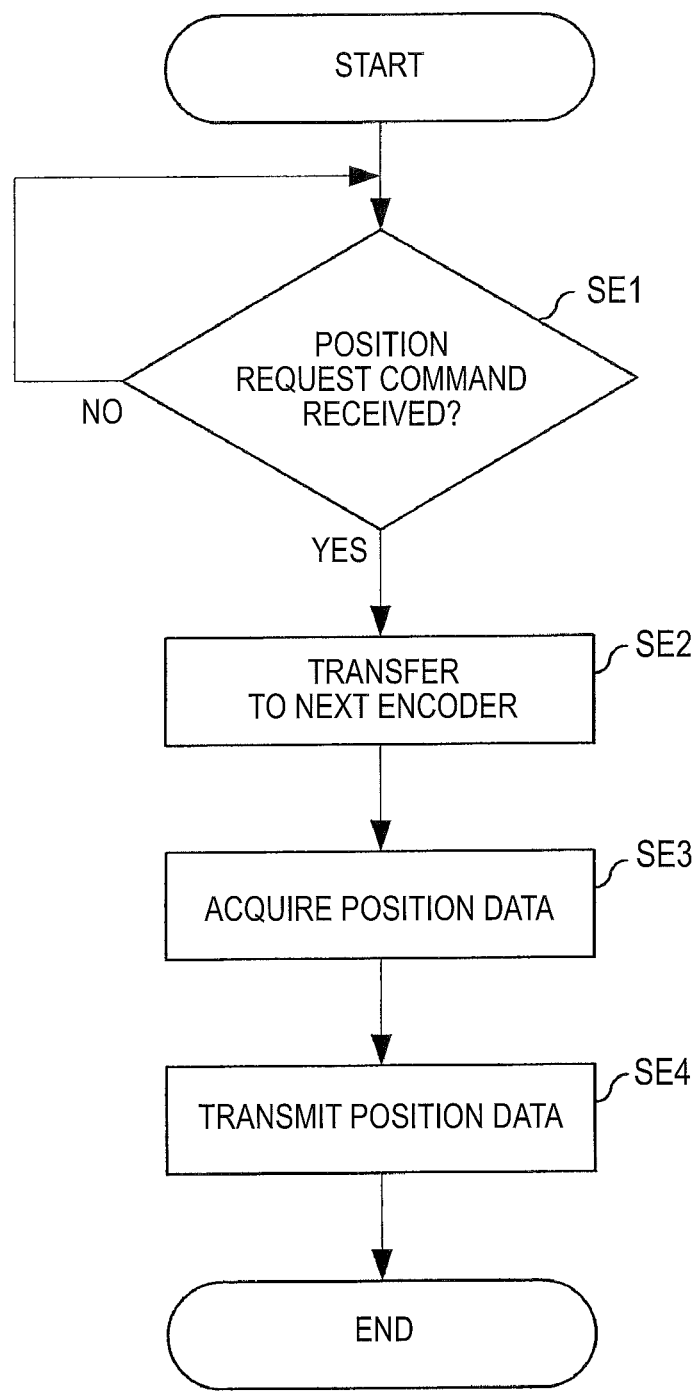
FIG. 7 is an explanatory view for explaining control procedures executed by a processing device of the encoder.

As shown in FIG. 7, if the receiver 202, in Step SE1, receives a position request command transmitted from the controller CT or the relaying encoder Er via the communicator 250, the receiver 202 transfers the position request command to the further encoder Ef via the communicator 260 in Step SE2. In the encoder E7, Step SE2 is not executed.

Then, in Step SE3, the data acquirer 220 acquires position data at a position latch timing of the corresponding motor M in response to the position request command received in the above Step SE1. That is, Step SE3 is corresponding to an example of a data acquisition step.

After that, in Step SE4, the data transmitter 222 transmits the position data acquired in the above Step SE3 to the controller CT or the relaying encoder Er via the communicator 250. That is, Step SE4 is corresponding to an example of a data transmission step.

Figure 8:
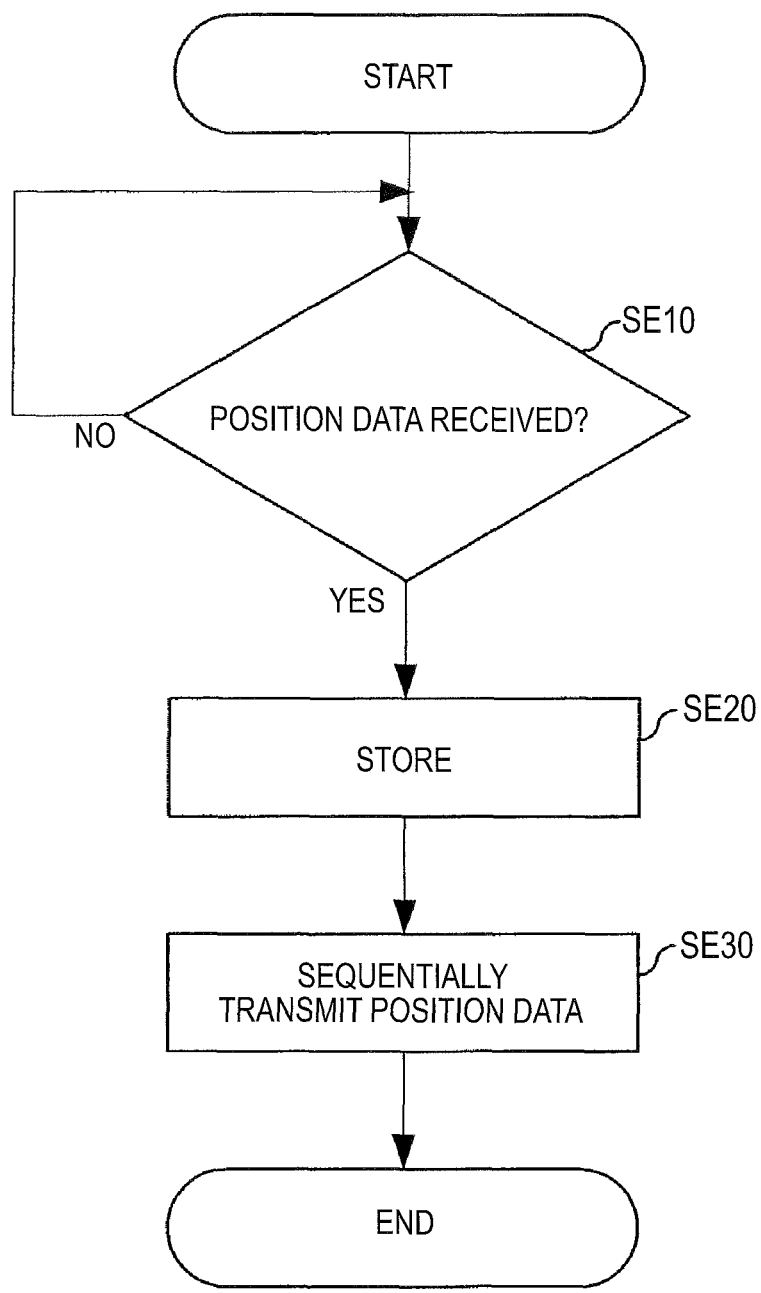
FIG. 8 is an explanatory view for explaining control procedures executed by the processing device of the encoder.
Figure 9:
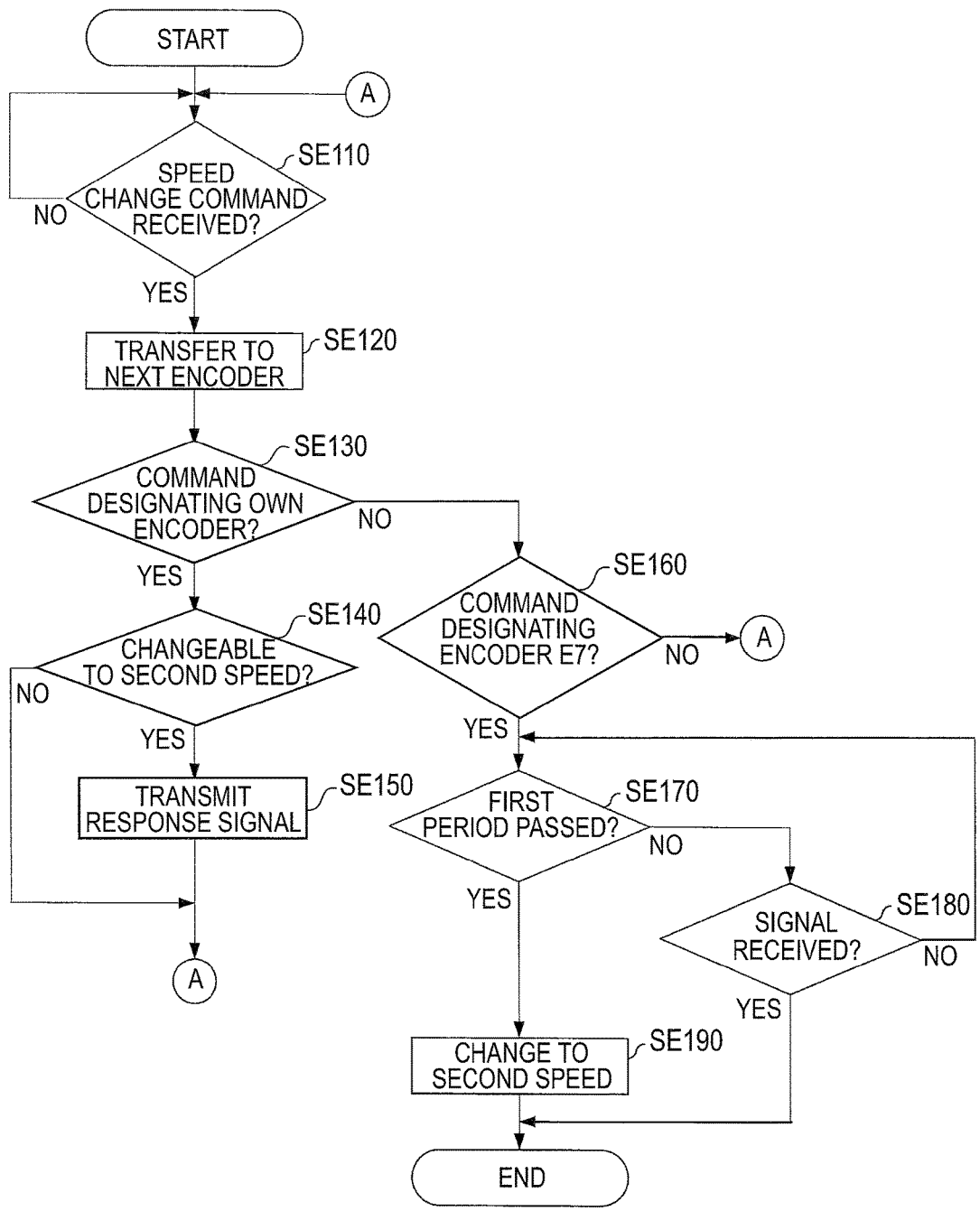
FIG. 9 is an explanatory view for explaining control procedures executed by the processing device of the encoder.

As shown in FIG. 8, if the receiver 204, in Step SE10, receives position data transmitted from the further encoder Ef via the communicator 260, the receiver 204 stores the position data in Step SE20. These Steps SE10 and SE20 are executed repeatedly.

Then, after transmitting the position data in the above Step SE4, the receiver 202, in Step SE30, transmits one or more position data stored in the above Step SE20 to the controller CT or the relaying encoder Er sequentially from the position data corresponding to the encoder E that is closest to the controller CT.

In the encoder E7, the processing shown in FIG. 8 is not executed.

As shown in FIG. 9, if the receiver 202, in Step SE110, receives a speed change command transmitted from the controller CT or the relaying encoder Er via the communicator 250, the receiver 202 transfers the speed change command to the further encoder Ef via the communicator 260 in Step SE120. In the encoder E7, Step SE120 is not executed.

After that, in Step SE130, the third reception determiner 206 determines whether the speed change command received in the above Step SE110, which is preceded and executed, is a speed change command designating the encoder E itself or not, based on the result of reception by the receiver 202. If the speed change command designates the encoder E itself, the determination in Step SE130 is satisfied and the processing shifts to Step SE140.

In Step SE140, the setting availability determiner 207 determines whether or not the communication speed of the communicators 250 and 260 can be changed to the second speed by the speed change command received in the above Step SE110. If the communication speed of the communicators 250 and 260 can be changed to the second speed by the speed change command, the determination in Step SE140 is satisfied and the processing shifts to Step SE150.

In Step SE150, the command responder 208 transmits a response signal to the controller CT or the relaying encoder Er via the communicator 250. That is, Step SE150 is corresponding to an example of a command response step. After that, the processing returns to Step SE110 and repeats similar procedures.

Meanwhile, if the communication speed cannot be changed to the second speed by the speed change command in Step SE140, the determination in Step SE140 is not satisfied. The processing returns to Step SE110 and repeats similar procedures.

If the speed change command does not designate the encoder E itself in Step SE130, the determination in Step SE130 is not satisfied and the processing shifts to Step SE160.

In Step SE160, the fourth reception determiner 212 determines whether the speed change command received in the above Step SE110 executed immediately before is a speed change command designating the encoder E7 or not, based on the result of reception by the receiver 202. If the speed change command does not designate the encoder E7, the determination in Step SE160 is not satisfied. The processing returns to Step SE110 and similar procedures are repeated. Meanwhile, if the speed change command designates the encoder-E7, the determination in Step SE160 is satisfied and the processing shifts to Step SE170.

In Step SE170, the first period determiner 216 determines whether or not a first period has passed since the reception of the speed change command designating the encoder E7 in the above Step SE110 executed immediately before. If the first period has not passed, the determination in Step SE170 is not satisfied and the processing shifts to Step SE180.

In Step SE180, the second reception determiner 214 determines whether or not a signal is received by the receivers 202 and 204 from the controller CT or another encoder E, based on the result of reception by the receiver 202. If a signal is not received, the determination in Step SE180 is not satisfied. The processing returns to Step SE170 and similar procedures are repeated. Meanwhile, if a signal is received, the determination in Step SE180 is satisfied and no change is made to the communication speed of the communicators 250 and 260 (the current first speed is maintained). The processing shown in FIG. 9 thus ends.

That is, Steps SE160, SE170, and SE180 are corresponding to an example of a synchronization control step. Of these steps, Step SE170 is corresponding to an example of a first period determination step, and Step SE180 is corresponding to an example of a second reception determination step.

Meanwhile, if the first period has passed in Step SE170, the determination in Step SE170 is satisfied and the processing shifts to Step SE190.

In Step SE190, the first configurator 218 changes the communication speed of the communicators 250 and 260 to the second speed by the speed change command received in the above Step SE110. That is, Step SE190 is corresponding to an example of a first setting change step.

The operations of the controller CT and the encoders E1 to E7 shown in FIGS. 5 to 9 described above are only an example. Other operations may also be employed.

Figure 10:
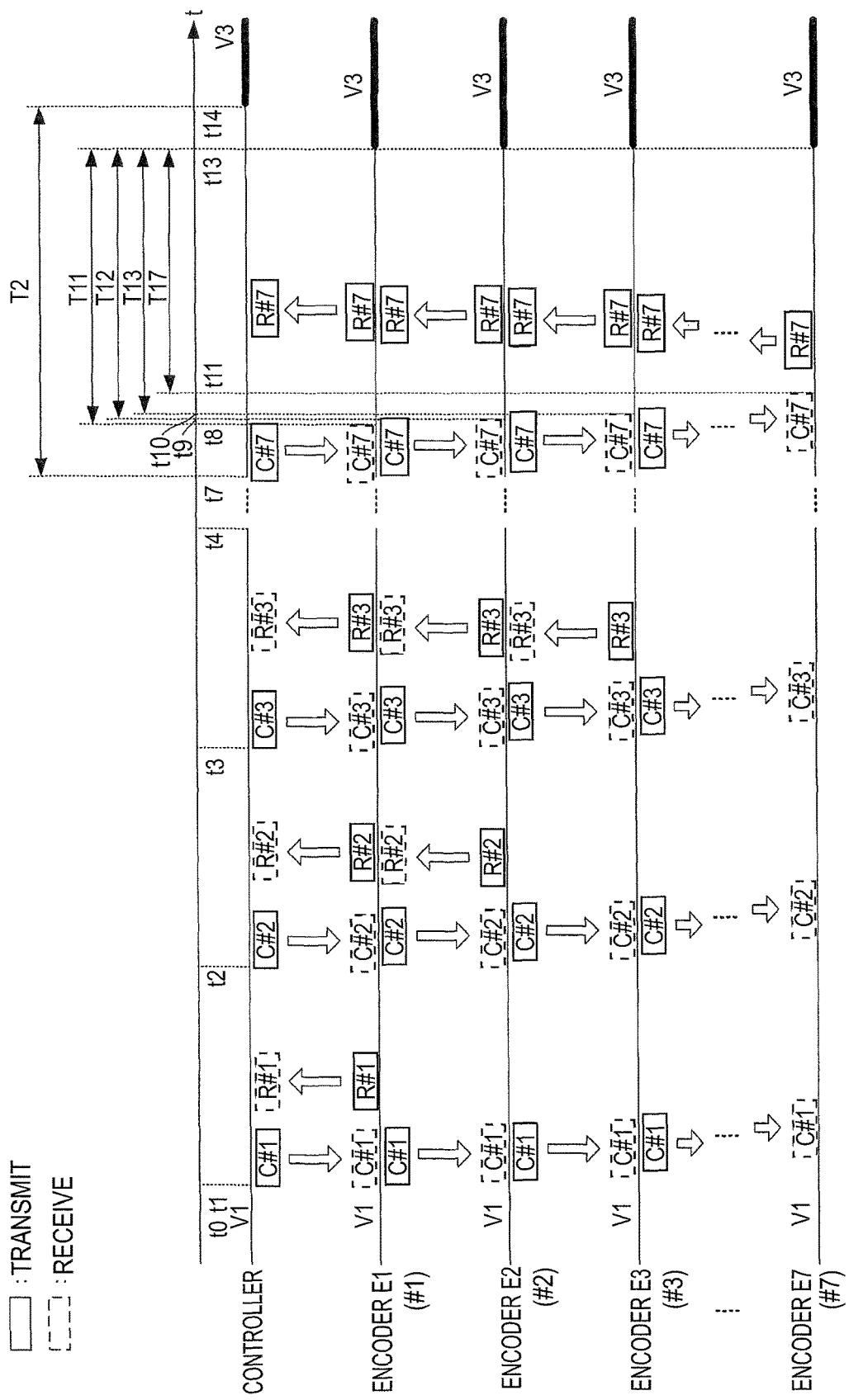
FIG. 10 is an explanatory view for explaining an example of operations of the controller and the encoder up to communication speed change.

4. Example of Operations up to Communication Speed Change in Controller and Encoders Next, an example of the operations up to communication speed change in the controller CT and the encoders E1 to E7 will be described with reference to FIG. 10 in order to facilitate the understanding of particularly advantageous effects of the encoder system ES. FIG. 10 schematically shows the operations up to communication speed change in the controller CT and the encoders E1 to E7, with a time axis taken horizontally in the illustration.

As shown in FIG. 10, at time t0, the communication speed of each of the controller CT and the encoders E1 to E7 is initially set to the speed V1.

Then, at time t1, a speed change command designating the encoder E1 (described as "C#1" in the illustration; here also referred to as a 'speed change command "C#1"') is transmitted from the controller CT to the encoder E1 at the speed V1. The speed change command "C#1" transmitted from the controller CT is sequentially transferred to the encoders E1 to E7 at the speed V1. In this case, from the encoder E1 receiving the speed change command "C#1" designating the encoder E1 itself, a response signal (described as "R#1" in the illustration; here also referred to as a 'response signal "R#1"') is transmitted to the controller CT at the speed V1 and received by the controller CT at the speed V1.

After that, at time t2, a speed change command designating the encoder E2 (described as "C#2" in the illustration; here also referred to as a 'speed change command "C#2"') is transmitted from the controller CT to the encoder E1 at the speed V1. The speed change command "C#2" transmitted from the controller CT is sequentially transferred to the encoders E1 to E7 at the speed V1. In this case, from the encoder E2 receiving the speed change command "C#2" designating the encoder E2 itself, a response signal (described as "R#2" in the illustration; here also referred to as a 'response signal "R#2"') is transmitted to the encoder E1 at the speed V1. The response signal "R#2" transmitted from the encoder E2 is transferred to the encoder E1 at the speed V1 and is subsequently transmitted from the encoder E1 to the controller Ct at the speed V1 and received by the controller CT at the speed V1.

Then, at time t3, a speed change command designating the encoder E3 (described as "C#3" in the illustration; here also referred to as a 'speed change command "C#3"') is transmitted from the controller CT to the encoder E1 at the speed V1. The speed change command "C#3" transmitted from the controller CT is sequentially transferred to the encoders E1 to E7 at the speed V1. In this case, from the encoder E3 receiving the speed change command "C#3" designating the encoder E3 itself, a response signal (described as "R#3" in the illustration; here also referred to as a 'response signal "R#3"') is transmitted to the encoder E2 at the speed V1. The response signal "R#3" transmitted from the encoder E3 is transferred in order of the encoders E2 and E1 at the speed V1 and is subsequently transmitted from the encoder E1 to the controller CT at the speed V1 and received by the controller CT at the speed V1.

After that, though not illustrated, at time after time t3 (here also referred to as "time t4"), a speed change command designating the encoder E4 (here also referred to as a 'speed change command "C#4"') is transmitted from the controller CT to the encoder E1 at the speed V1. Also, at time after time t4 (here also referred to as "time t5"), a speed change command designating the encoder E5 (here also referred to as a 'speed change command "C#5"') is transmitted from the controller CT to the encoder E1 at the speed V1. At time after time t5 (here also referred to as "time t6"), a speed change command designating the encoder E6 (here also referred to as a 'speed change command "C#6"') is transmitted from the controller CT to the encoder E1 at the speed V1. At time t7 after time t6, a speed change command designating the encoder E7 (described as "C#7" in the illustration; here also referred to as a 'speed change command "C#7"') is transmitted from the controller CT to the encoder E1 at the speed V1. In this case, though not illustrated, the encoders E1 to E7 behave similarly to the above.

Then, when a first period T11 has passed since time t8 when the encoder E1 receives the speed change command "C#7", the communication speed of the encoder E1 is changed from the speed V1 to the speed V3. Also, when a first period T12 has passed since time t9 when the encoder E2 receives the speed change command "C#7", the communication speed of the encoder E2 is changed from the speed V1 to the speed V3. When a first period T13 has passed since time t10 when the encoder E3 receives the speed change command "C#7", the communication speed of the encoder E3 is changed from the speed V1 to the speed V3. Although not particularly illustrated, when a first period has passed since the time when the respective encoders E4 to E6 receive the speed change command "C#7", the communication speed of the respective encoders E4 to E6 is changed from the speed V1 to the speed V3. Also, when a first period T17 has passed since time t11 when the encoder E7 receives the speed change command "C#7", the communication speed of the encoder E7 is changed from the speed V1 to the speed V3. In this case, the timing of change when the communication speed of each of the encoders E1 to E7 is changed is substantially the same, that is, time t13.

After that, at time t14 when a second period T2 has passed since time t7 when the controller Ct transmits the speed change command "C#7", the communication speed of the controller CT is changed from the speed V1 to the speed V3.

5. Example of Advantageous Effects of This Embodiment

As described above, in the encoder system ES according to this embodiment, the encoders E1 to E7 are connected to the controller CT in series via the cables 10 and sequentially transfer a signal transmitted from the controller CT. Thus, compared with the case where the controller CT and each of the encoders E1 to E7 are connected via a cable on a one-to-one basis, the wiring between the controller CT and the encoders E can be reduced or streamlined significantly.

In the embodiment, in the case where the command transmitter 110 of the controller CT transmits to the encoder E a command signal that changes this setting to the predetermined setting and then the first configurator 218 of the encoder E receives the command signal to change the functional setting of an encoder E from the current setting to a predetermined setting, the following effect may be obtained. For the sake of the above configuration, functional setting of the encoder E can be changed to an optimal setting according to the system configuration. Accordingly, various system configurations can be flexibly applicable.

In the embodiment, in the case where the command generator 106 of the controller CT generates a command signal designating one encoder E of the encoders E1 to E7 to change the above setting, the following effect may be obtained. That is, for the sake of the above configuration, it is possible to designate a specific encoder E to change the setting, to set the order of the encoders in which the setting is changed regardless of the arrangement of the encoders E, or to do the like.

In the embodiment, in a case where the command responder 208 of an encoder E transmits a response signal to the controller CT after receiving a command signal designating the encoder E itself and it determines that the current setting can be changed to a predetermined setting, thereby the first configurator 218 changes the setting, the following effect may be obtained. That is, for the sake of the above configuration, it is possible to designate a specific encoder E to change the setting with confirming whether communication is available. Therefore, the setting change of the encoder E can be secured. Also, since the controller CT needs not have any function to determine whether a desired setting change is applicable to the encoder E, the configurations (functional configuration and hardware configuration) of the controller CT can be simplified.

In the embodiment, in the case where the transmission controller 116 of the controller CT controls the command transmitter 110 to sequentially transmit a command signal designating each of the encoders E1 to E7 in a sequential order from the command signal designating the encoder E1 to the command signal designating the encoder E7, the following effect may be obtained. That is, for the sake of the above configuration, it is possible to specify a position where a communication malfunction is occurring in the following manner. For examples, the communication malfunction (the influence of a wiring defect, noise or the like) is occurring between the controller CT and the encoder E1 if there is no response signal from the encoder E1, or a communication malfunction (the influence of a wiring defect, noise or the like) is occurring between the encoder E6 and the encoder E7 if there is no response signal from the encoder E7 though a response signal is sent back from the encoders E1 to E6.

In the embodiment, in the case where the first reception determiner 114 of the controller CT determines whether or not a response signal is received from the encoder E to which a command signal is transmitted, and the transmission controller 116 controls the command transmitter 110 to transmit a command signal designating the further encoder Ef next to the encoder E in the above order if the first reception determiner 114 determines that a response signal is received from the encoder E, the following effect may be obtained. That is, for the sake of the above configuration, it is possible to confirm communication availability separately for each of the encoders E1 to E7 from the side closer to the controller CT to change the setting. Therefore, reliability of changing the setting of the encoder E can be enhanced. Also, it is possible to stop changing the setting in the encoder E in the middle to execute another process such as outputting an alarm.

Here, if timing of changing the setting of the communication mode with the controller CT is different among encoders E, namely, between the controller CT and each one of the encoders E1 to E7 that are connected to the controller CT in series, communication may not be possibly established during that period. That is, the setting of the communication mode needs to be changed simultaneously for all of the encoders E. In the embodiment, in a case where the synchronization controller 210 of an encoder E synchronizes the timing of change so that the timing of change when the first configurator 218 changes the setting is substantially the same as that of the other encoders E, based on the result of reception by the receiver 102, the following effect may be obtained. That is, with the above configuration, the synchronization controller 210 can substantially synchronize the timing of setting change among the encoders E1 to E7, even in the case of transmitting a command signal while confirming communication availability separately for each of the encoders E1 to E7 from the side closer to the controller CT. Thus, the influence caused by the difference in the timing of setting change can be lowered and the reliability of the system may be enhanced.

Here, the command signal designating the encoder E7 is transmitted at last from the controller CT to pass through all the encoders E, thereby the command signal is received by this encoder E7. At this time, the receivers 202 of the respective encoders E1 to E7 receive the command signal substantially simultaneously. Therefore, in the embodiment, in the case where the first period determiner 216 of the synchronization controller 210 determines whether the first period has passed since the reception by the receiver 202 of the command signal designating the encoder E7, and where the first configurator 218 changes the setting if the first period determiner 216 determines that the first period has passed, the following effect may be obtained. That is, with the above configuration, the timings of setting change among the encoders E1 to E7 can be more accurately synchronized.

Here, when changing the setting of an encoder E, if the first configurator 218 is executing certain processing (transmission/reception of a signal or the like), there is a possibility that the setting cannot be changed normally. In the embodiment, in the case where the first configurator 218 changes the setting, the second reception determiner 214 determines that a signal is not received by the receiver 202 from the controller CT. Accordingly, the non-processing state of the first configurator 218 can be secured during the passage of the first period, and after that, the change of the setting can be executed. Therefore, the setting change can be more likely to be secured.

In the embodiment, in the case where the second configurator 126 of the controller CT changes the functional setting of the controller CT from the current setting to a predetermined setting corresponding to the target setting of the encoder E if the first reception determiner 114 determines that a response signal is received from the encoder E7, the following effect may be obtained. That is, since the above configuration enables the setting of the controller CT to be changed to a corresponding setting after it is determined that all the encoders E can cope with a desired setting change, the controller CT and the encoders E can cooperatively change the setting.

In the embodiment, in the case where the transmission stopper 120 of the controller CT stops the transmission of a signal to the encoder E after the command transmitter 110 transmits a command signal designating the encoder E7, then the second period determiner 122 determines whether or not the second period has passed since the command transmitter 110 transmits the command signal designating the encoder E7, and the second configurator 126 changes the setting if the second period determiner 122 determines that the second period has passed, the following effect may be obtained. That is, with the above configuration, the non-processing state of the second configurator 126 of the controller CT can be secured until the second period has passed, and after that, the change of the setting can be executed. Therefore, the setting change of the controller CT is more likely to be secured. Also, since the second period from the transmission of the command signal corresponding to the encoder E7 connected most distantly from the controller CT to the change of the setting is set to be longer than the first period, the time for changing the setting in the encoder E can be secured and reliability of the change of setting in the encoder E is more likely to be enhanced.

In the embodiment, in the case where the first command transmitter 112 of the command transmitter 110 transmits to the encoder E a speed change command to change the communication speed to the second speed, and the first configurator 218 receives the speed change command to change the communication speed with the controller CT to the second speed, the following effect may be obtained. That is, since the system configuration optimizes the communication speed between the controller CT and the encoder E, various system configurations can be flexibly applicable. More specifically, the command transmitter 110 of the controller CT is configured to perform control to transmit the command signal to the encoder E at the first speed. That is, in the case of changing the communication speed of the encoder E, the controller CT communicates at a lower speed to change the communication speed of the encoder E to a higher speed. When the communication speed becomes higher, a communication delay arises due to the influence of physical specifications to cause a detection error. Therefore, compared with the case where the controller CT communicates at a higher speed to change the communication speed of the encoder E to a lower speed, for example, the reliability of communication at the time of transmitting a command signal can be enhanced.

Here, the communication cycle of the controller CT and the encoder E depends on the control cycle of the controller CT. Therefore, the communication cycle is constant regardless of the number of the encoders E. Accordingly, as the number of the encoders E connected to the controller CT becomes greater, the communication speed needs to be increased to shorten the data transfer time for each encoder E, because the position data needs to be collected from the greater number of encoders E in the constant communication cycle. In the embodiment, in the case where the speed setter 108 sets the second speed based on the number of the encoders E, the communication speed between the controller CT and the encoder E can be optimized according to the system configuration. Thus, various system configurations can be flexibly applicable.

6. Modifications

Although the embodiments are described above in detail with reference to the accompanying drawings, the scope of the technical idea described in the claims is not limited to these embodiments. A person skilled in the arts may contemplate various changes, modifications, combinations and the like within the scope of the technical idea. Therefore, as a matter of course, the disclosed technique with such changes, modifications, combinations and the like should fall within the scope of the technical idea. Such modifications and the like will be described below.

6-1. Case of Changing Transmission Channel Code

In the embodiment, the case where the communication speed of the encoders E1 to E7 with the controller CT is changed is described as an example. However, the transmission channel code between the respective encoders E1 to E7 and the controller CT can be changed as well. The transmission channel code may be, for example, RZ code, NRZ code, NRZI code, AMI code, CMI code, Manchester code or the like.

In this modification, the first command transmitter 112 of the command transmitter 110 of the controller CT transmits the transmission channel code change command to the encoder E1 via the communicator 150. The transmission channel code change command transmitted from the controller CT to the encoder E1 is sequentially transferred up to the encoder E7 by the encoders E1 to E7. Then, if the first configurator 218 of each of the encoders E1 to E7 receives the transmission channel code change command, the first configurator 218 changes the transmission channel code of the communicators 250 and 260 to the predetermined transmission channel code by the transmission channel code change command.

According to this modification, since the transmission channel code between the controller CT and the encoder E can be changed to an optimal transmission channel code according to the system configuration, various system configurations can be flexibly dealt with.

6-2. Case of Changing Position Latch Timing

In the embodiments and the modifications, changing the communication speed or changing the transmission channel code between the encoders E1 to E7 and the controller CT are described as the examples of changing the communication mode. However, the position latch timing of the encoders E1 to E7 can be changed as well.

In this modification, a third command transmitter (not illustrated) of the command transmitter 110 of the controller CT is configured to perform control to transmit to the encoder E1 a timing change command (corresponding to an example of a third command signal) which changes the position latch timing from the current timing to a predetermined timing. The timing change command transmitted from the controller CT to the encoder E1 is sequentially transferred up to the encoder E7 by the encoders E1 to E7. Then, if the first configurator 218 of each of the encoders E1 to E7 receives the timing change command, the first configurator 218 changes the position latch timing to the predetermined timing by the timing change command.

According to this modification, the following effect can be achieved. That is, when the encoders E1 to E7 are connected to the controller CT in series, the timing of receiving the position request command transmitted from the controller CT may be delayed at the encoder E that is more distanced from the controller CT. Therefore, when the encoders E1 to E7 acquire position data in response to the position request command, the position latch timing of acquiring the position data differs among the encoders E1 to E7, which turns out lowering the reliability of the position data. In this modification, since the timing of acquiring the position data can be coordinated among the respective encoders E1 to E7, the reliability of the position data can be enhanced.

7. Example of Configurations of Controller and Encoders 7-1. Example of Configuration of Controller Hereinafter, an example of the configuration of the controller CT which realizes the processing by the processing device 100 according to the above embodiment and modifications will be described with reference to FIG. 11.

Figure 11:
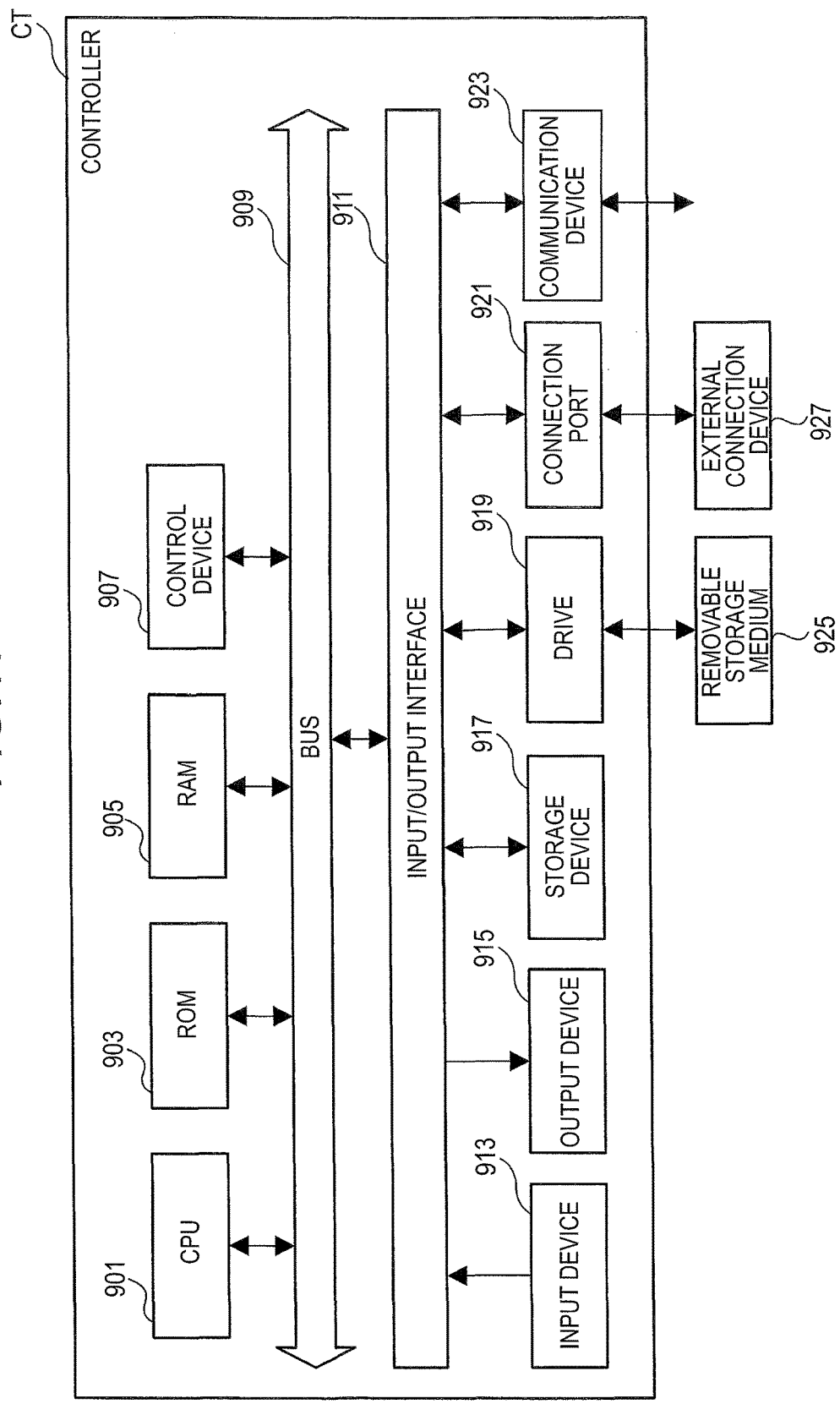
FIG. 11 is an explanatory view for explaining an example of the configuration of the controller.

As shown in FIG. 11, the controller CT includes, for example, a CPU 901, a ROM 903, a RAM 905, a control device 907 such as a dedicated integrated circuit for a specific purpose like AISC or FPGA, or another electric circuit, an input device 913, an output device 915, a storage device 917, a drive 919, a connection port 921, and a communication device 923. These components are connected in such a way as to be able to communicate signals with each other via a bus 909 and an input/output interface 911.

A program can be recorded in recording devices such as the ROM 903, the RAM 905, and the storage device 917.

A program can be also recorded temporarily or permanently on a removable storage medium 925 like a magnetic disk such as a flexible disk, an optical disk various kinds of CDs, MO disks, and DVDs, or a semiconductor memory. Such a removable storage medium 925 can be also provided as so-called packaged software. In this case, the program recorded on the removable storage medium 925 may be read out by the drive 919 and recorded in the above recording device via the input/output interface 911 and the bus 909 or the like.

A program can be also recorded at a download site, another computer, another recording medium and the like (not illustrated). In this case, the program is transferred via a network NW such as a LAN or the internet, and the communication device 923 receives this program. The program received by the communication device 923 may be recorded in the above recording device via the input/output interface 911 and the bus 909 or the like.

A program can be also recorded in a suitable external connection device 927. In this case, the program may be transferred via a suitable connection port 921 and recorded in the above recording device via the input/output interface 911 and the bus 909 or the like.

By the CPU 901 executing various kinds of processing according to the program recorded in the recording device, the processing by the processing device 100 can be implemented. At this time, for example, the CPU 901 may directly read out and execute the program from the recording device, or may temporarily load the program on the RAM 905 and subsequently execute the program. Moreover, for example, if the CPU 901 receives the program via the communication device 923, the drive 919, or the connection port 921, the CPU 901 may directly execute the received program without recording the program in the recording device.

The CPU 901 may also carry out various kinds of processing based on a signal or information inputted from the input device 913 such as a mouse, keyboard, or microphone (not illustrated), for example, according to need.

The CPU 901 may also output the result of executing the processing from the output device 915 such as a display device or audio output device. Moreover, the CPU 901 may transmit the result of the processing via the communication device 923 or the connection port 921 according to need, or may record the result of the processing in the recording device or the removable storage medium 925.

While the case where the processing by the processing device 100 is implemented by the program executed by the CPU 901 is described above, a part or the entirety of the processing may be executed by the control device 907.

7-2. Example of Configuration of Encoders

Hereinafter, an example of the configuration of each of the encoders E1 to E7 implementing the processing by the processing device 200 according to the above embodiment and modifications will be described with reference to FIG. 12.

Figure 12:
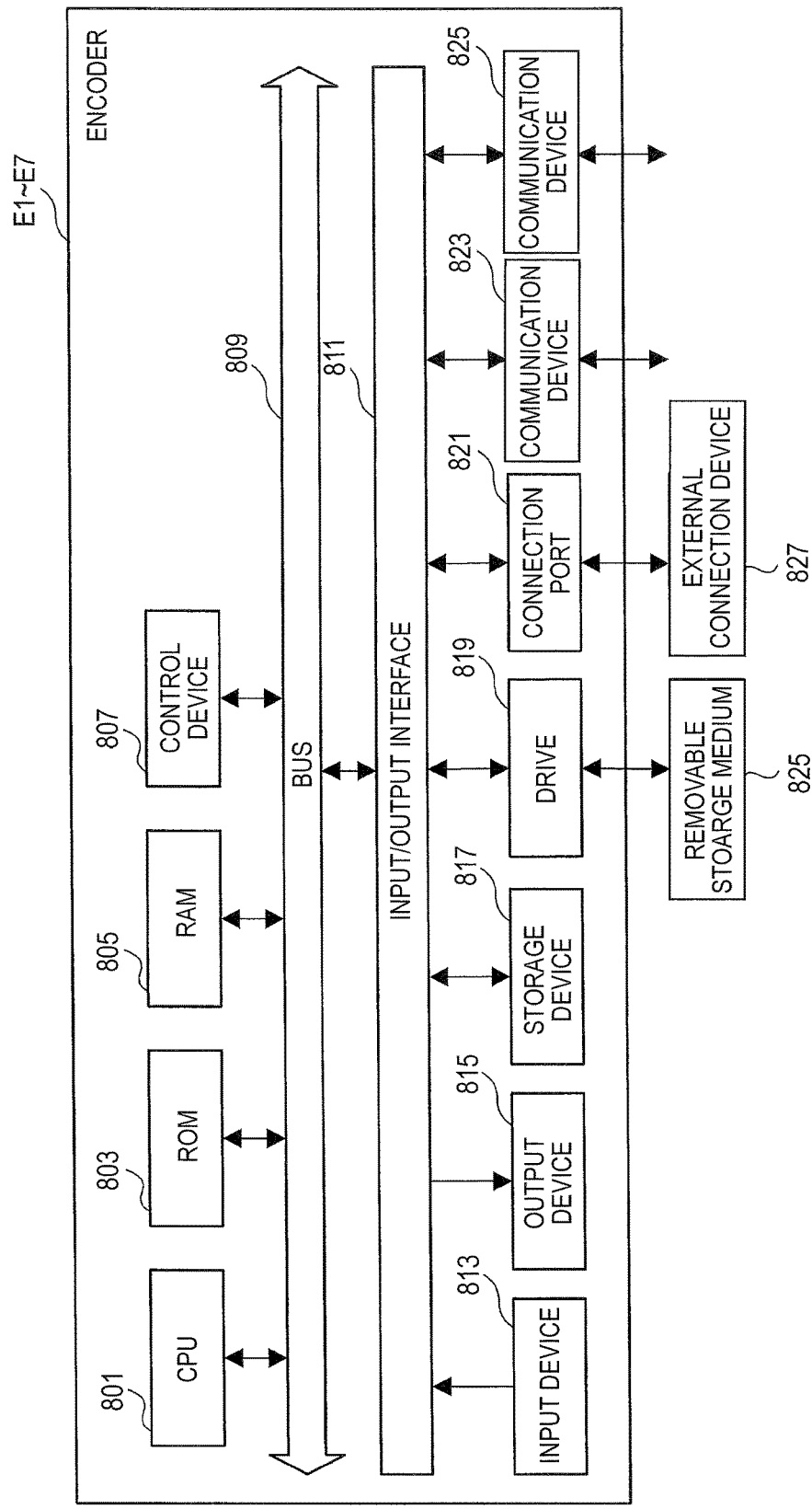
FIG. 12 is an explanatory view for explaining an example of the configuration of the encoder.

As shown in FIG. 12, each of the encoders E1 to E7 includes, for example, a CPU 801, a ROM 803, a RAM 805, a control device 807 such as a dedicated integrated circuit for a specific purpose like AISC or FPGA, or another electric circuit, an input device 813, an output device 815, a storage device 817, a drive 819, a connection port 821, and communication devices 823 and 825. These components are connected in such a way as to be able to communicate signals with each other via a bus 809 and an input/output interface 811.

A program can be recorded in recording devices such as the ROM 803, the RAM 805, and the storage device 817.

A program can be also recorded temporarily or permanently on a removable storage medium 825 like a magnetic disk such as a flexible disk, an optical disk such as various kinds of CDs, MO disks, and DVDs, or a semiconductor memory. Such a removable storage medium 825 can be also provided as so-called packaged software. In this case, the program recorded on the removable storage medium 825 may be read out by the drive 819 and recorded in the above recording device via the input/output interface 811 and the bus 809 or the like.

A program can be also recorded at a download site, another computer, another recording medium and the like (not illustrated). In this case, the program is transferred via a network NW such as a LAN or the internet, and the communication devices 823 and 825 receive this program. The program received by the communication device 823 may be recorded in the above recording device via the input/output interface 811 and the bus 809 or the like.

A program can be also recorded in a suitable external connection device 827. In this case, the program may be transferred via a suitable connection port 821 and recorded in the above recording device via the input/output interface 811 and the bus 809 or the like.

By the CPU 801 executing various kinds of processing according to the program recorded in the recording device, the processing by the processing device 200 can be implemented. At this time, for example, the CPU 801 may directly read out and execute the program from the recording device, or may temporarily load the program on the RAM 805 and subsequently execute the program. Moreover, for example, if the CPU 801 receives the program via the communication device 823, the drive 819, or the connection port 821, the CPU 801 may directly execute the received program without recording the program in the recording device.

The CPU 801 may also carry out various kinds of processing based on a signal or information inputted from the input device 813 such as a mouse, keyboard, or microphone (not illustrated), for example, according to need.

The CPU 801 may also output the result of executing the processing from the output device 815 such as a display device, audio output device or the like. Moreover, the CPU 801 may transmit the result of the processing via the communication device 823 or the connection port 821 according to need, or may record the result of the processing in the recording device or the removable storage medium 825.

While the case where the processing by the processing device 200 is implemented by the program executed by the CPU 801 is described above, a part or the entirety of the processing may be executed by the control device 807.

The arrows shown in FIGS. 2, 3, 11, and 12 indicate examples of flows of signals and should not limit the directions in which the signals flow.

The steps described in the flowcharts of FIGS. 5 to 9 include processing steps that are not necessarily carried out in time series but executed in parallel or individually, as well as processing steps carried out in time series in the described orders. Also, in some cases, the order of processing steps carried out in time series can be changed suitably.

Techniques according to the embodiments and modifications may be suitably combined, other than those described above.

Although not described specifically with an example, various changes can be made to the embodiment and modifications without departing from the scope of the disclosure.

It should be understood by those skilled in the art that various modifications, combinations, sub-combinations and alterations may occur depending on design requirements and other factors insofar as they are within the scope of the appended claims or the equivalents thereof.

Obviously, numerous modifications and variations of the present invention are possible in light of the above teachings. It is therefore to be understood that within the scope of the appended claims, the invention may be practiced otherwise than as specifically described herein.

What is claimed is:

1. A sensor system comprising:
a controller to transmit a signal; and
sensors connected to the controller in series via at least one cable to sequentially transfer the signal transmitted from the controller via the at least one cable,
wherein the controller comprises first circuitry configured to perform control to transmit a command signal to at least one of the sensors to change a functional setting of the at least one of the sensors from a current setting to a first target setting,
wherein the at least one of the sensors comprises second circuitry to change the current setting to the first target setting when the at least one of the sensors receives the command signal,
wherein the at least one of the sensors includes plural synchronized processing sensors,
wherein the second circuitry of the plural synchronized processing sensors is further configured to
detect reception of the signal from the controller, and
match a first timing among the plural synchronized sensors such that the plural synchronized processing sensors change the current setting substantially at the first timing based on the reception of the signal,
wherein the second circuitry of the plural synchronized processing sensors is configured to determine whether a first period has lapsed since the plural synchronized processing sensors receive the command signal designating a distal sensor, the distal sensor being connected most distantly to the controller among the sensors, and
wherein the second circuitry of the plural synchronized processing sensors changes the current setting when determining that the first period has lapsed.

2. The sensor system according to claim 1, wherein the first circuitry is further configured to generate the command signal designating one of the sensors to control the one of the sensors to change the current setting.

3. The sensor system according to claim 2,
wherein the second circuitry is further configured to perform control to transmit a response signal to the controller, when the one of the sensors receives the command signal designating the one of the sensors and the one of the sensors determines the current setting is changeable to the first target setting, and
wherein the second circuitry of the one of the sensors changes the current setting after transmitting the response signal to the controller.

4. The sensor system according to claim 3, wherein the first circuitry is configured to perform control to sequentially transmit the command signal designating each of the sensors in a sequential order from a proximal sensor to the distal sensor, the proximal sensor being connected most closely to the controller among the sensors.

5. The sensor system according to claim 4,
wherein the first circuitry is further configured to determine whether the controller receives the response signal from a previously designated sensor to which the command signal is transmitted among the at least one of the sensors, and
wherein the first circuitry is configured to perform control to transmit the command signal designating another sensor next to the previously designated sensor in the sequential order, when the controller receives the response signal from the previously designated sensor.

6. The sensor system according to claim 5,
wherein the second circuitry of the plural synchronized processing sensors is configured to determine whether the plural synchronized processing sensors receive the signal from the controller during the first period from a timing when the plural synchronized processing sensors receive the command signal designating the distal sensor, and
wherein the second circuitry of the plural synchronized processing sensors changes the current setting when determining that the signal is not received during the first period.

7. The sensor system according to claim 5, wherein the first circuitry is further configured to change the functional setting of the controller from the current setting to a second target setting corresponding to the first target setting when determining that the controller receives the response signal from the distal sensor as the previously designated sensor.

8. The sensor system according to claim 6, wherein the first circuitry is further configured to change the functional setting of the controller from the current setting to a second target setting corresponding to the first target setting when determining that the controller receives the response signal from the distal sensor as the previously designated sensor.

9. The sensor system according to claim 8,
wherein the first circuitry is further configured to stop transmission of the signal to the at least one of the sensors after transmitting the command signal designating the distal sensor,
wherein the first circuitry is further configured to determine whether a second period longer than the first period has lapsed since the controller transmits the command signal designating the distal sensor, and
wherein the first circuitry changes the current setting when determining that the second period has lapsed.

10. The sensor system according to claim 1,
wherein the first circuitry is configured to perform control to transmit a first command signal to the at least one of the sensors to change a communication mode with the controller from a current communication mode to a target communication mode, and
wherein the second circuitry is configured to change the communication mode with the controller to the target communication mode when the at least one of the sensors receives the first command signal.

11. The sensor system according to claim 1,
wherein the first circuitry is configured to perform control to transmit a second command signal to the at least one of the sensors at a first speed, the second command signal being to change a communication speed with the controller to a second speed higher than the first speed, and
wherein the second circuitry is configured to change the communication speed with the controller to the second speed when the at least one of the sensors receives the second command signal.

12. The sensor system according to claim 11, wherein the first circuitry further configured
to detect a number of the sensors connected, and
to set the second speed based on the number of the sensors.

13. The sensor system according to claim 1,
wherein the second circuitry further configured
to acquire sensing data of a sensing target at a second timing in response to a request signal from the controller, and
to perform control to transmit the sensing data to the controller,
wherein the first circuitry is configured to perform control to transmit a third command signal to the at least one of the sensors to change the second timing from a current timing to a target timing, and
wherein the second circuitry changes the second timing to the target timing when the at least one of the sensors receives the third command signal.

14. The sensor system according to claim 1,
wherein the first circuitry is configured to perform control to transmit an additional command signal to the at least one of the sensors, the additional command signal being to change a transmission channel code between the controller and the at least one of the sensors, and
wherein the second circuitry is configured to change the transmission channel code when the at least one of the sensors receives the additional command signal.

15. A sensor system comprising:
control means for transmitting a signal; and
sensor means for sequentially transferring the signal transmitted from the controller via at least one cable,
wherein the control means comprises first circuitry configured to perform control to transmit a command signal to at least one of the sensor means to change a functional setting of the at least one of the sensor means from a current setting to a first target setting,
wherein the at least one of the sensor means comprises second circuitry to change the current setting to the first target setting when the at least one of the sensor means receives the command signal,
wherein the at least one of the sensor means includes plural synchronized processing sensors
wherein the second circuitry of the plural synchronized processing sensors is further configured to
detect reception of the signal from the control means, and
match a first timing among the plural synchronized sensors such that the plural synchronized processing sensors change the current setting substantially at the first timing based on the reception of the signal,
wherein the second circuitry of the plural synchronized processing sensors is configured to determine whether a first period has lapsed since the plural synchronized processing sensors receive the command signal designating a distal sensor, the distal sensor being connected most distantly to the control means among the sensor means, and
wherein the second circuitry of the plural synchronized processing sensors changes the current setting when determining that the first period has lapsed.

16. A communication method for sensors, comprising:
transmitting a signal from a controller to the sensors; and
transferring the signal serially via at least one cable among the sensors,
wherein the controller comprises first circuitry configured to perform control to transmit a command signal to at least one of the sensors to change a functional setting of the at least one of the sensors from a current setting to a first target setting,
wherein the at least one of the sensors comprises second circuitry to change the current setting to the first target setting when the at least one of the sensors receives the command signal,
wherein the at least one of the sensors includes plural synchronized processing sensors,
wherein the second circuitry of the plural synchronized processing sensors is further configured to
detect reception of the signal from the controller, and
match a first timing among the plural synchronized sensors such that the plural synchronized processing sensors change the current setting substantially at the first timing based on the reception of the signal,
wherein the second circuitry of the plural synchronized processing sensors is configured to determine whether a first period has lapsed since the plural synchronized processing sensors receive the command signal designating a distal sensor, the distal sensor being connected most distantly to the controller among the sensors, and
wherein the second circuitry of the plural synchronized processing sensors changes the current setting when determining that the first period has lapsed.

* * * * *